United States Patent
Nam et al.

(10) Patent No.: US 11,924,134 B2
(45) Date of Patent: Mar. 5, 2024

(54) POSITIONING REFERENCE SIGNAL WITH SUB-BAND-BASED COMB OFFSET

(71) Applicant: QUALCOMM Incorporated, San Diego, CA (US)

(72) Inventors: Wooseok Nam, San Diego, CA (US); Peter Gaal, San Diego, CA (US); Sony Akkarakaran, Poway, CA (US); Junyi Li, Fairless Hills, PA (US); Tao Luo, San Diego, CA (US); Jingchao Bao, San Diego, CA (US); Yucheng Dai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/643,119

(22) Filed: Dec. 7, 2021

(65) Prior Publication Data

US 2023/0179365 A1    Jun. 8, 2023

(51) Int. Cl.
*H04L 5/00* (2006.01)
*H04B 1/7143* (2011.01)
*H04W 64/00* (2009.01)

(52) U.S. Cl.
CPC ......... *H04L 5/0051* (2013.01); *H04B 1/7143* (2013.01); *H04W 64/006* (2013.01)

(58) Field of Classification Search
CPC ... H04L 5/0051; H04B 1/7143; H04W 64/006
See application file for complete search history.

(56) References Cited

U.S. PATENT DOCUMENTS

| 2008/0043708 A1* | 2/2008 | Muharemovic ......... H04L 47/10 370/348 |
| 2020/0014515 A1* | 1/2020 | Qin ....................... H04L 5/0051 |
| 2020/0259683 A1 | 8/2020 | Manolakos et al. |

FOREIGN PATENT DOCUMENTS

| EP | 4024743 A1 * | 7/2022 | ........... H04L 5/0048 |
| EP | 4145931 A1 * | 3/2023 | ........... H04L 5/0016 |
| WO | 2021067008 A1 | 4/2021 | |
| WO | WO-2022023509 A1 * | 2/2022 | |

OTHER PUBLICATIONS

Machine Translation of KR-20200127883 A. (Year: 2023).*
Machine Translation of CN 113366900-B. (Year: 2023).*
Machine translation of TW-200917703-A. (Year: 2023).*
International Search Report and Written Opinion—PCT/US2022/047166—ISA/EPO—dated Jan. 26, 2023.

* cited by examiner

*Primary Examiner* — Jean B Corrielus
(74) *Attorney, Agent, or Firm* — Procopio, Cory, Hargreaves & Savitch LLP

(57) ABSTRACT

Aspects presented herein may improve UE positioning by providing enhanced resource patterns that may reduce positioning latency and resource overhead for the UE positioning. In one aspect, a transmitter divides a reference signal associated with UE positioning into a plurality of sub-bandwidths, each of the plurality of sub-bandwidths being associated with a comb offset. The transmitter transmits, to a receiver, the reference signal via the plurality of sub-bandwidths. In another aspect, a receiver receives a configuration to measure a reference signal associated with UE positioning. The receiver receives, from a transmitter, the reference signal via a plurality of sub-bandwidths, each of the plurality of sub-bandwidths being associated with a comb offset.

20 Claims, 20 Drawing Sheets

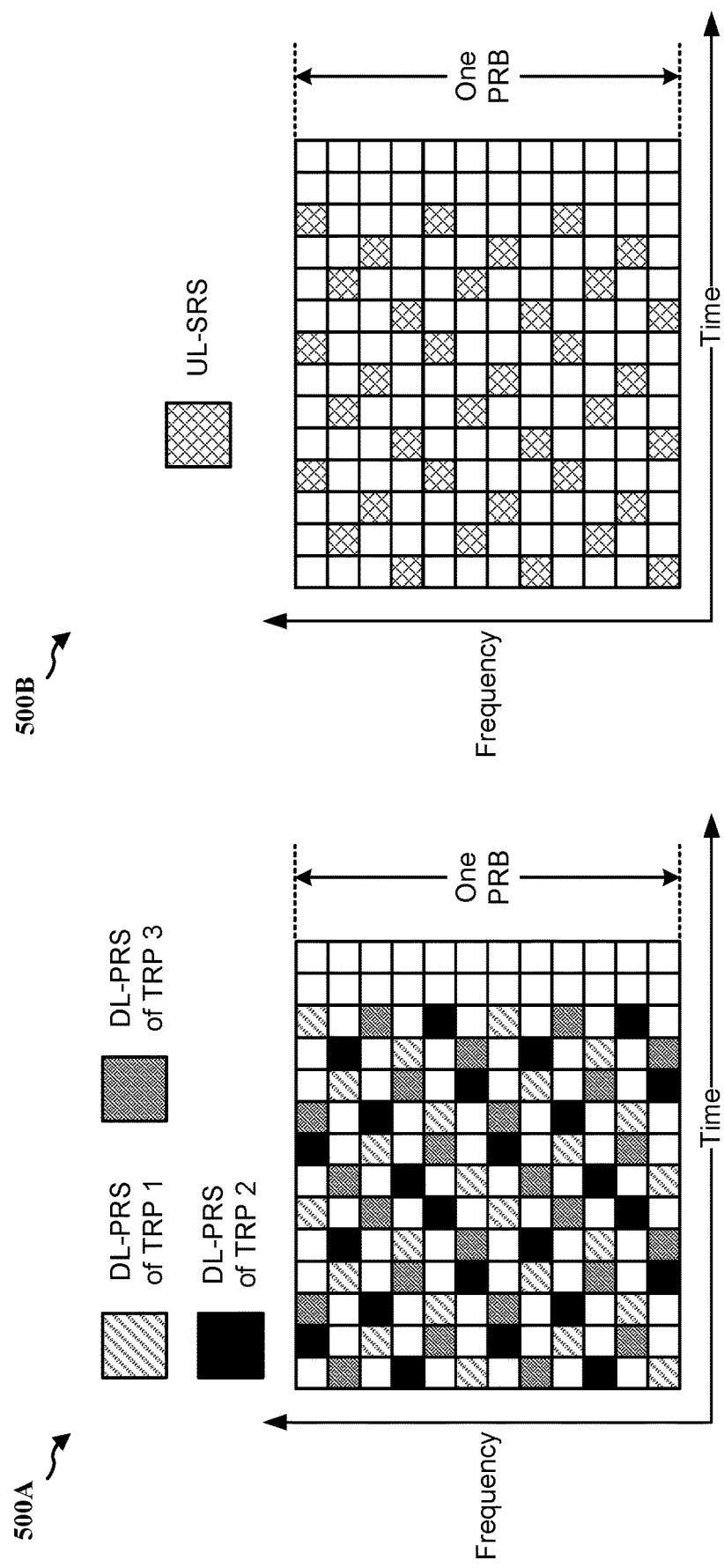

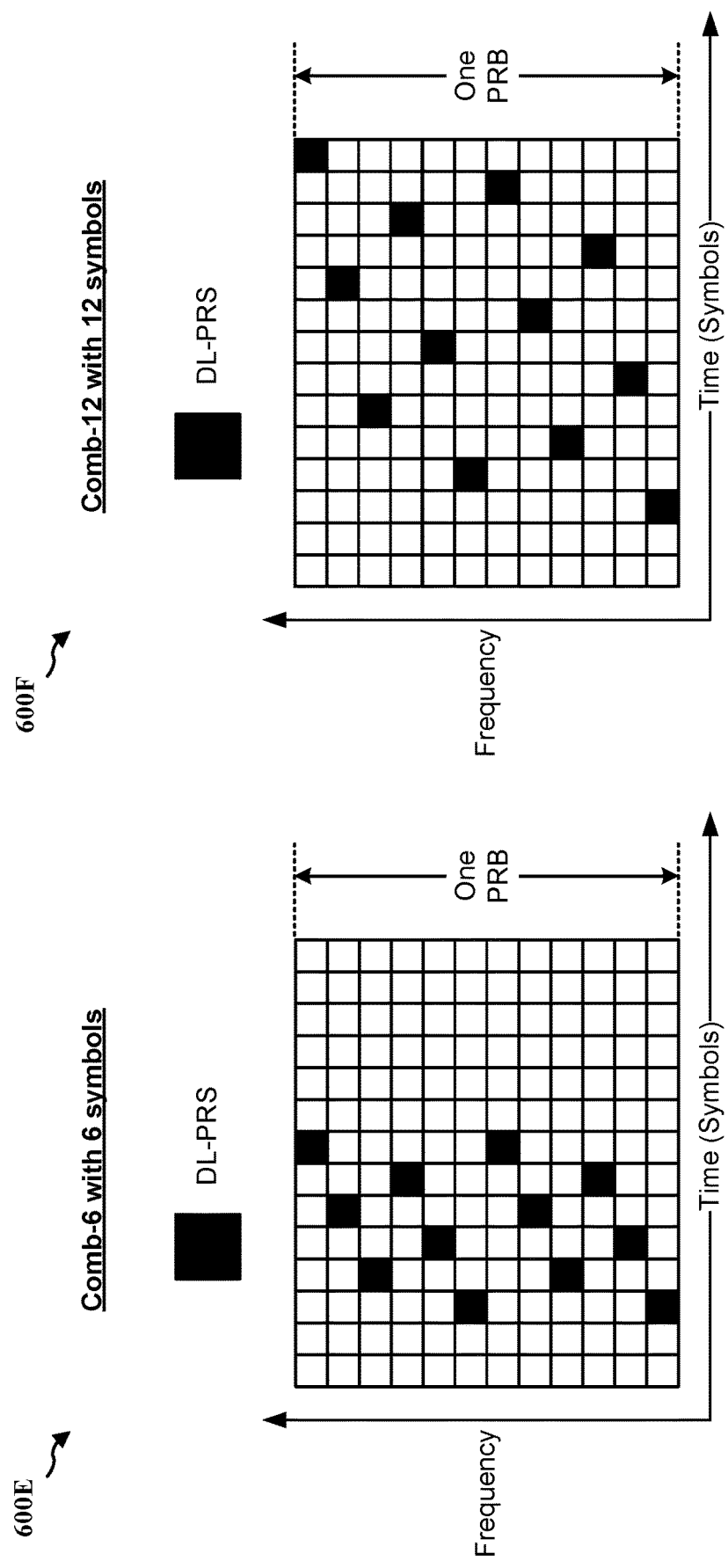

POSITIONING REFERENCE SIGNAL WITH SUB-BAND-BASED COMB OFFSET

TECHNICAL FIELD

The present disclosure relates generally to communication systems, and more particularly, to wireless communications involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication systems may also support a number of cellular network-based positioning technologies, where the geographic location of a wireless device may be determined based on measuring radio signals exchanged between the wireless device and other wireless devices. For example, a distance between a wireless device and a transmission reception point (TRP) may be estimated based on the time it takes for a reference signal (e.g., a positioning reference signal (PRS)) transmitted from the TRP to reach the wireless device. Other examples of cellular network-based positioning technologies may include downlink-based, uplink-based, and/or downlink-and-uplink-based positioning methods.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus divides a reference signal associated with user equipment (UE) positioning into a plurality of sub-bandwidths, each of the plurality of sub-bandwidths being associated with a comb offset. The apparatus transmits, to a receiver, the reference signal via the plurality of sub-bandwidths.

In an aspect of the disclosure, a method, a computer-readable medium, and an apparatus are provided. The apparatus receives a configuration to measure a reference signal associated with UE positioning. The apparatus receives, from a transmitter, the reference signal via a plurality of sub-bandwidths, each of the plurality of sub-bandwidths being associated with a comb offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating an example of downlink-positioning reference signal (DL-PRS) transmitted from multiple transmission-reception points (TRPs) in accordance with various aspects of the present disclosure.

FIG. 5B is a diagram illustrating an example of uplink-sounding reference signal (UL-SRS) transmitted from a UE in accordance with various aspects of the present disclosure.

FIG. 6E is a diagram illustrating an example DL-PRS resource pattern in accordance with various aspects of the present disclosure.

FIG. 6F is a diagram illustrating an example DL-PRS resource pattern in accordance with various aspects of the present disclosure.

DETAILED DESCRIPTION

Figure 1:
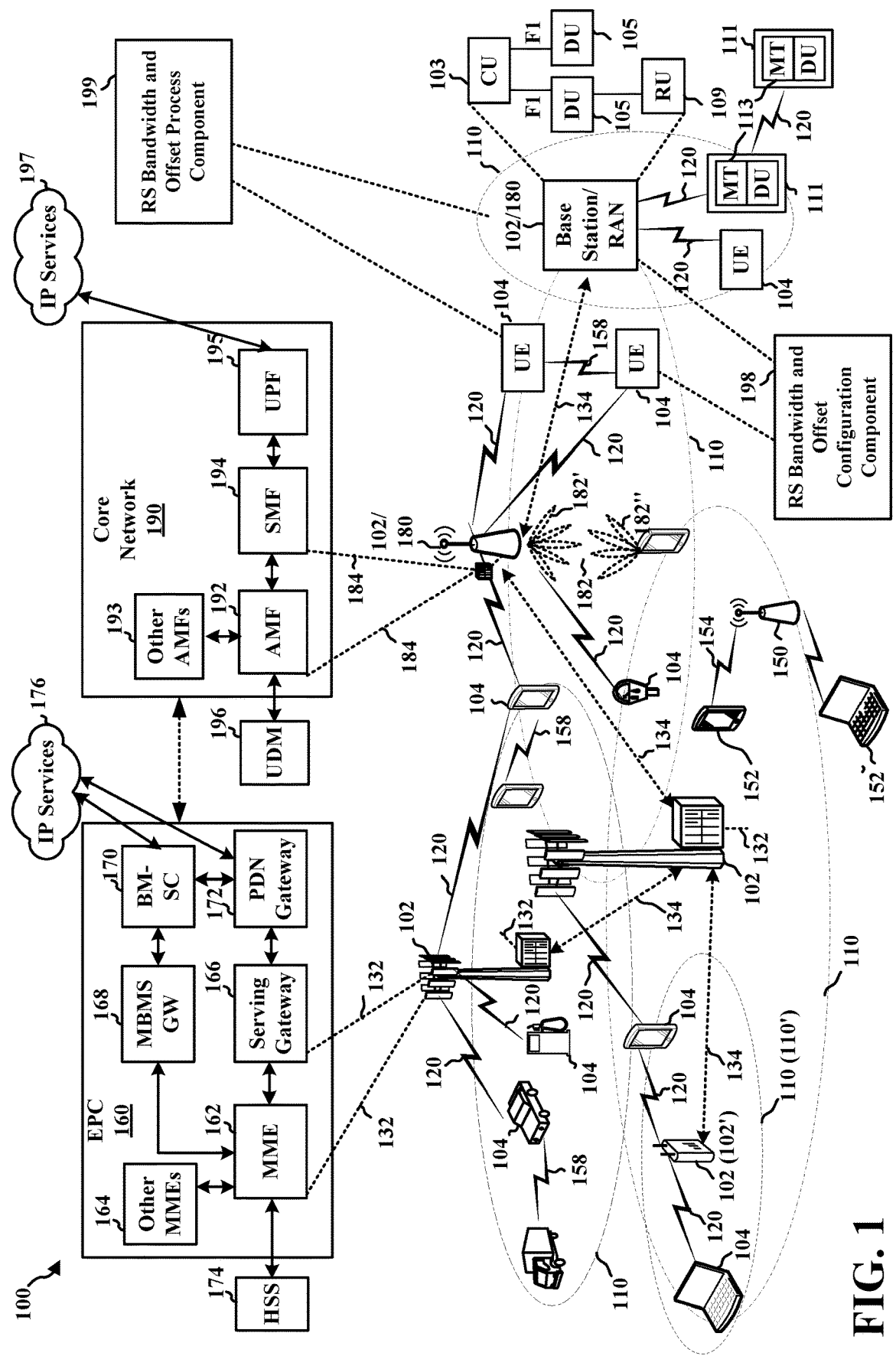
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve UE positioning by providing enhanced resource patterns that may reduce positioning latency and resource overhead for the UE positioning. Aspects presented herein may provide enhanced resource patterns for positioning reference signals that may not be based on a staggered pattern. For example, in some positioning scenarios, as a UE may have a rough knowledge on its position (e.g., based on previous positioning session or other sensors), a higher positioning range may not be specified for the positioning scenarios. In other words, a resource pattern with less resource elements and not based on a staggered pattern may be used by a transmitting device (e.g., a TRP, a UE, etc.) to achieve the same or similar positioning performance and accuracy as a resource pattern based on a staggered pattern.

In certain aspects, a base station 102/180 and/or a UE 104 may include an RS bandwidth and offset configuration component 198 configured to transmit reference signals associated with UE positioning with an enhanced resource patterns to conserve signaling overhead and radio resources. In one configuration, the RS bandwidth and offset configuration component 198 may be configured to divide a reference signal associated with UE positioning into a plurality of sub-bandwidths, each of the plurality of sub-bandwidths being associated with a comb offset. In such configuration, the RS bandwidth and offset configuration component 198 may transmit, to a receiver, the reference signal via the plurality of sub-bandwidths.

In certain aspects, a base station 102/180 and/or a UE 104 may include an RS bandwidth and offset process component 199 configured to receive reference signals associated with UE positioning with an enhanced resource patterns to conserve signaling overhead and radio resources. In one configuration, the RS bandwidth and offset process component 199 may be configured to receive a configuration to measure a reference signal associated with UE positioning. In such configuration, the RS bandwidth and offset process component 199 may receive, from a transmitter, the reference signal via a plurality of sub-bandwidths, each of the plurality of sub-bandwidths being associated with a comb offset.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
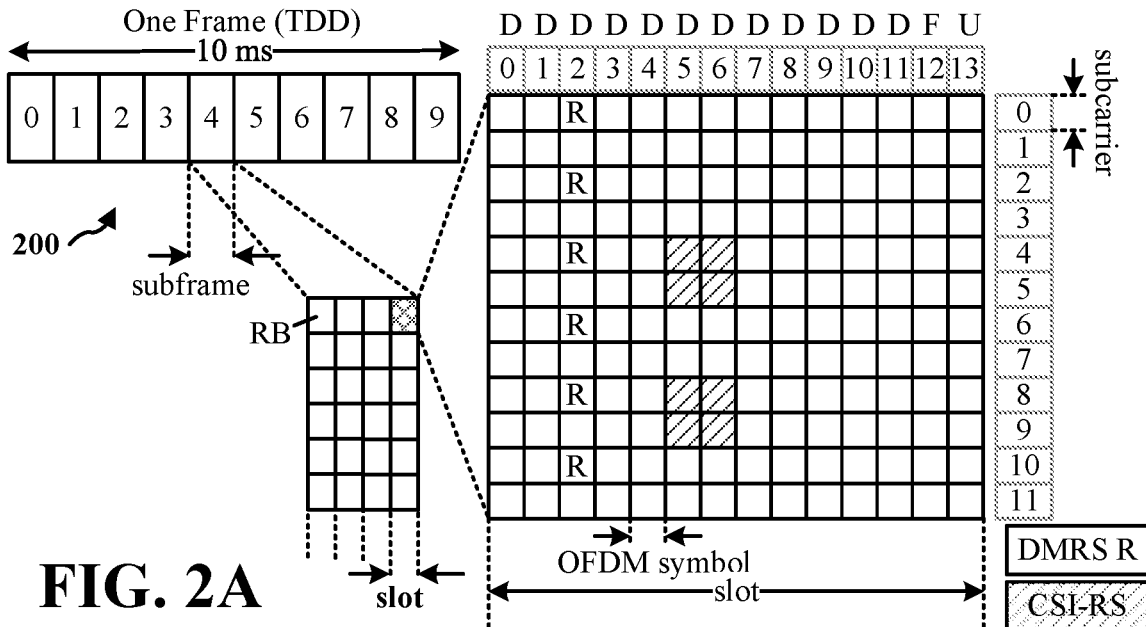
FIG. 2A is a diagram illustrating an example of a first frame, in accordance with various aspects of the present disclosure.
Figure 2B:
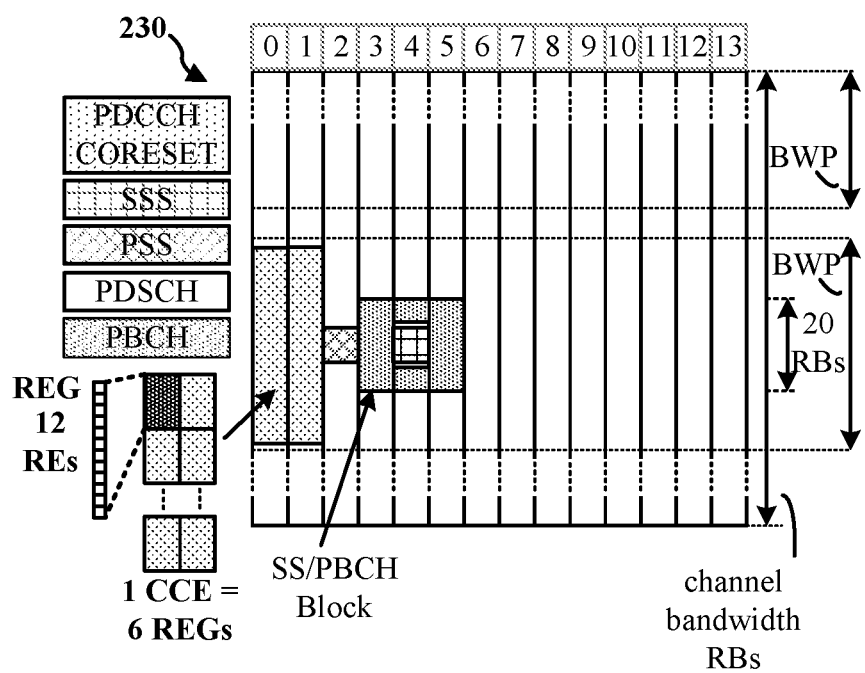
FIG. 2B is a diagram illustrating an example of DL channels within a subframe, in accordance with various aspects of the present disclosure.
Figure 2C:
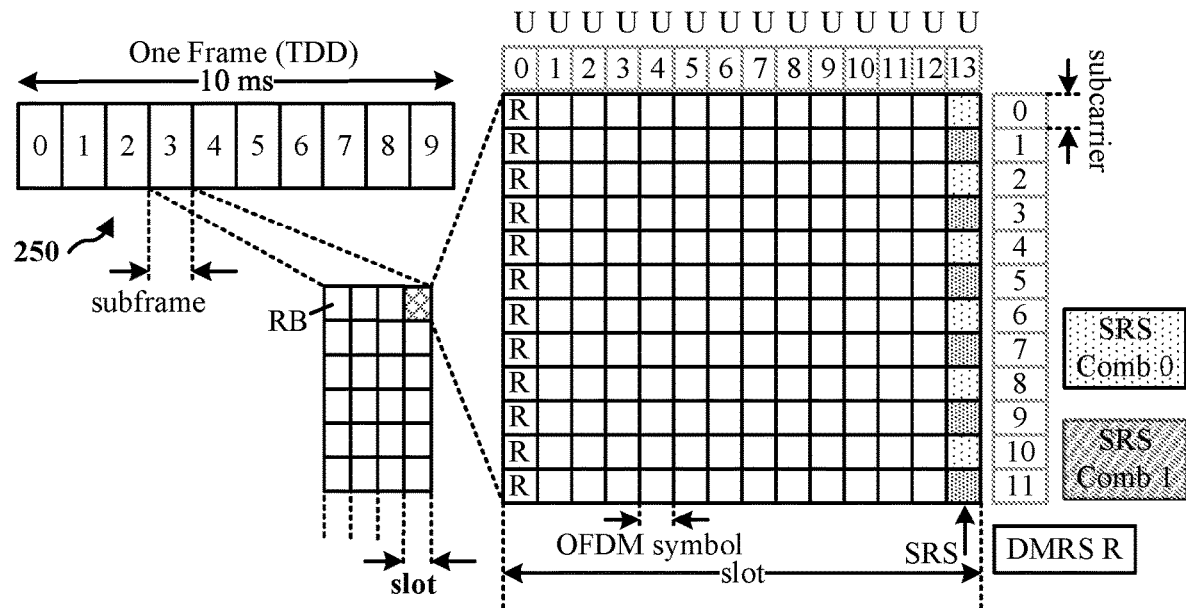
FIG. 2C is a diagram illustrating an example of a second frame, in accordance with various aspects of the present disclosure.
Figure 2D:
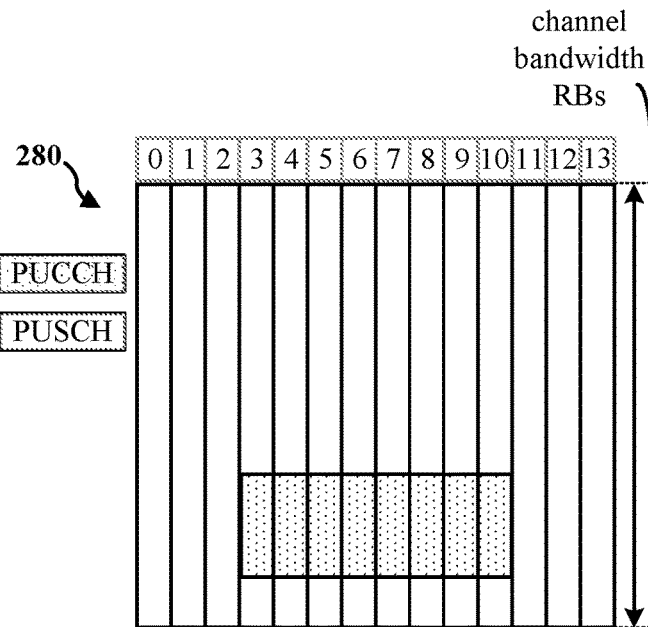
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [kHz]$ | Cyclic prefix |
|---|---|---|
| 0 | 15 | Normal |

| μ | SCS<br>Δf = 2^μ · 15[kHz] | Cyclic prefix |
|---|---|---|
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
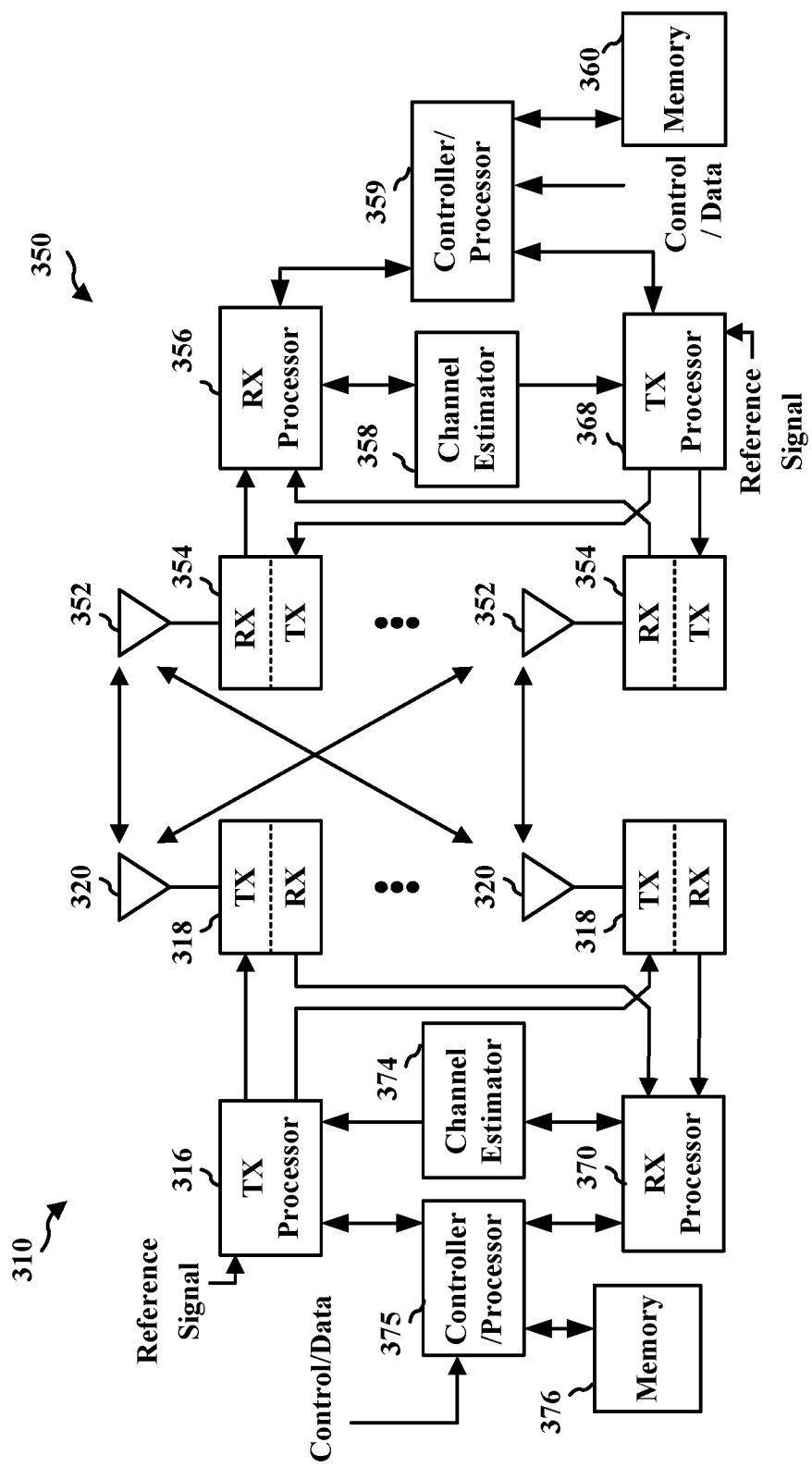
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In one example, at least one of the TX processor 368, the RX processor 356, and the controller/processor 359 may be configured to perform aspects in connection with the RS bandwidth and offset configuration component 198 and/or the RS bandwidth and offset process component 199 of FIG. 1. In another example, at least one of the TX processor 316, the RX processor 370, and the controller/processor 375 may be configured to perform aspects in connection with the RS bandwidth and offset configuration component 198 and/or the RS bandwidth and offset process component 199 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (which may also be referred to as a reference cell or a reference gNB) and at least one non-reference base station in assistance data (AD). The UE may then measure the RSTD between the reference base station and each of the non-reference base stations. Based on the known locations of the involved base stations and the RSTD measurements, the positioning entity may estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180) that includes aggregated or disaggregated components, such as described in connection with FIG. 1. For example, as an example of a disaggregated RAN, a base station may include CU, one or more DUs, one or more RUs, and/or one or more TRPs. One or more disaggregated components may be located at different locations. For example, different TRPs may be located at different geographic locations. In another example, a TRP may refer to a set of geographically co-located antennas (e.g., antenna array (with one or more antenna elements)) supporting transmission point (TP) and/or reception point (RP) functionality. Thus, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., a location server, an LMF, or an SLP) may provide assistance data (AD) to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty (e.g., a search space window) around the expected RSTD. In some cases, the value range of the expected RSTD may be plus-minus (+/−) 500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs. In this context, "RSTD" may refer to one or more measurements indicative of a difference in time of arrival between a PRS transmitted by a base station, referred to herein as a "neighbor base station" or a "measuring base station," and a PRS transmitted by a reference base station. A reference base station may be selected by a location server and/or by a UE to provide good or sufficient signal strength observed at a UE, such that a PRS may be more accurately and/or more quickly acquired and/or measured, such as without any special assistance from a serving base station.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^\mu*\{4, 5, 8, 10, 16, 20, 32, 40, 64, 80, 160, 320, 640, 1280, 2560, 5120, 10240\}$ slots, where $\mu=0, 1, 2, 3$. The repetition factor may have a length selected from $\{1, 2, 4, 6, 8, 16, 32\}$ slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
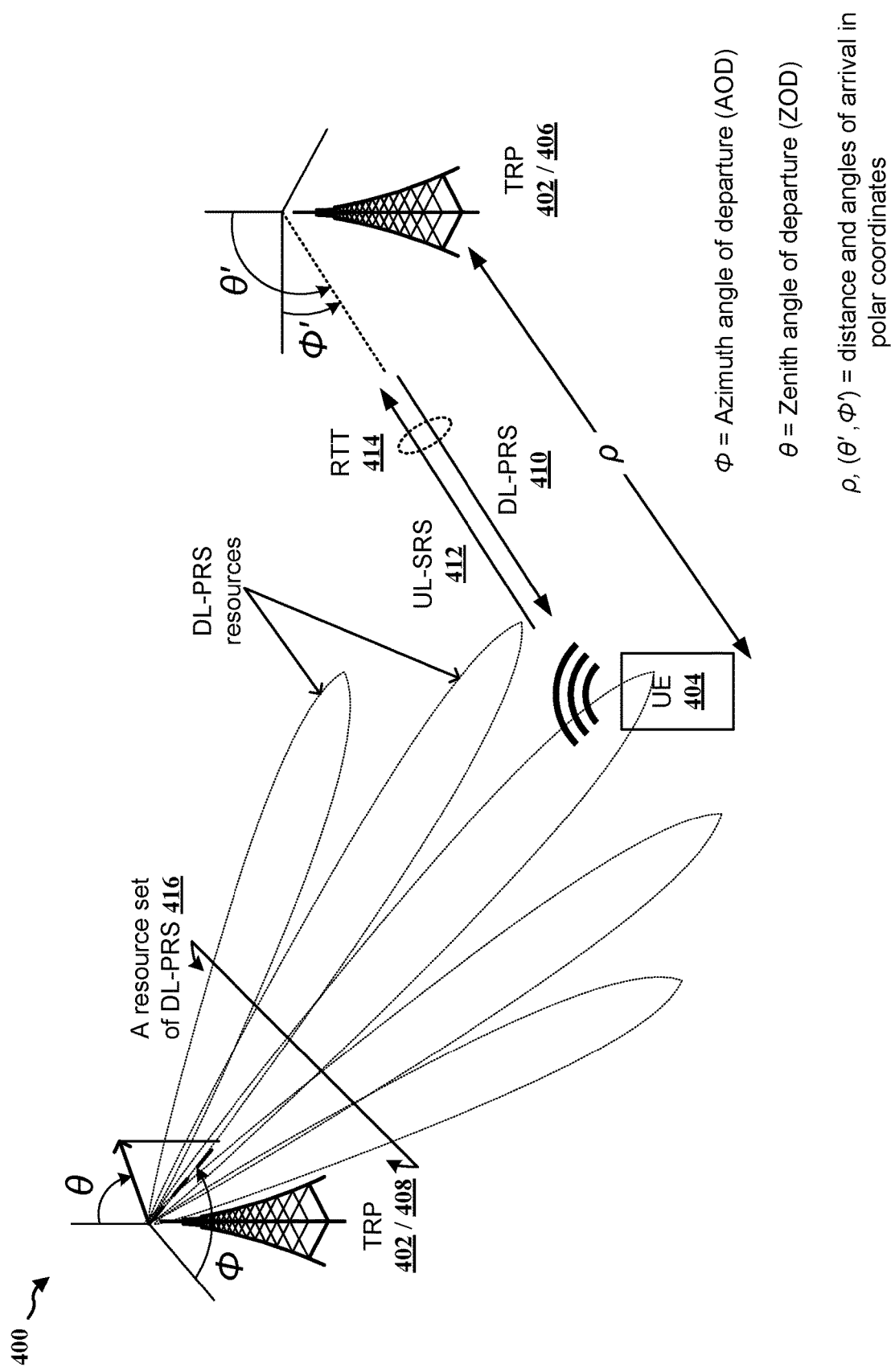
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple TRPs 402 may perform round trip time (RTT) measurements for signals transmitted to and received from the UE 404 to determine the approximate distance of UE 404 with respect to each of the multiple TRPs 402. Similarly, the UE 404 may perform RTT measurements for signals transmitted to and received from the TRPs 402 to determine the approximate distance of each TRP with respect to the UE 404. Then, based at least in part on the approximate distances of UE 404 with respect to the multiple TRPs 402, a location management function (LMF) that is associated with the TRPs 402 and/or the UE 404 may estimate the position of UE 404. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, a serving base station associated with the TRP 406 or an LMF associated with the TRP 406 may identify the position of UE 404 (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 or an LMF associated with the UE 404 may identify the position of TRP 406 with respect to the UE 404. The multi-RTT measurement mechanism may be initiated by the LMF that is associated with the TRP 406/408 and/or the UE 404. A TRP may configure UL-SRS resources to a UE via radio resource control (RRC) signaling. In some examples, the UE and the TRP may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more TRPs may be used to estimate the position of the UE and/or the distance of the UE with respect to each TRP. For example, referring back to FIG. 4, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a serving base station (or to the LMF associated with the base station). Based on the DL-PRS beam measurements, the serving TRP or the LMF may derive the azimuth angle (e.g., Φ) of departure and the zenith angle (e.g., θ) of departure for DL-PRS beams of the TRP 408. Then, the serving TRP or the LMF may estimate the position of UE 404 with respect to the TRP 408 based on the azimuth angle of departure and the zenith angle of departure of the DL-PRS beams. Similarly, for the UL-AoA, a position of a UE may be estimated based on UL-SRS beam measurements measured at different TRPs, such as at the TRPs 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the TRPs based on the azimuth angle of arrival and the zenith angle of arrival of the UL-SRS beams.

FIG. 5A is a diagram 500A illustrating an example of DL-PRS transmitted from multiple TRPs in accordance with various aspects of the present disclosure. In one example, a serving base station may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A shows an example of a comb-6 DL-PRS configuration, where the pattern for the DL-PRS from different TRPs may be repeated after six (6) symbols.

FIG. 5B is a diagram 500B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

FIGS. 6A to 6H are diagrams 600A to 600H, respectively, illustrating example patterns of DL-PRS resource within a slot in accordance with various aspect of the present disclosure. A DL-PRS resource may spans within a slot 2, 4, 6, or 12 consecutive symbols with a fully frequency-domain staggered pattern. The DL-PRS resource may be configured in a high layer configured DL or FL symbol of a slot. In addition, all REs of a given DL-PRS resource may have a constant energy per resource element (EPRE).

Figures 6A, 6B:
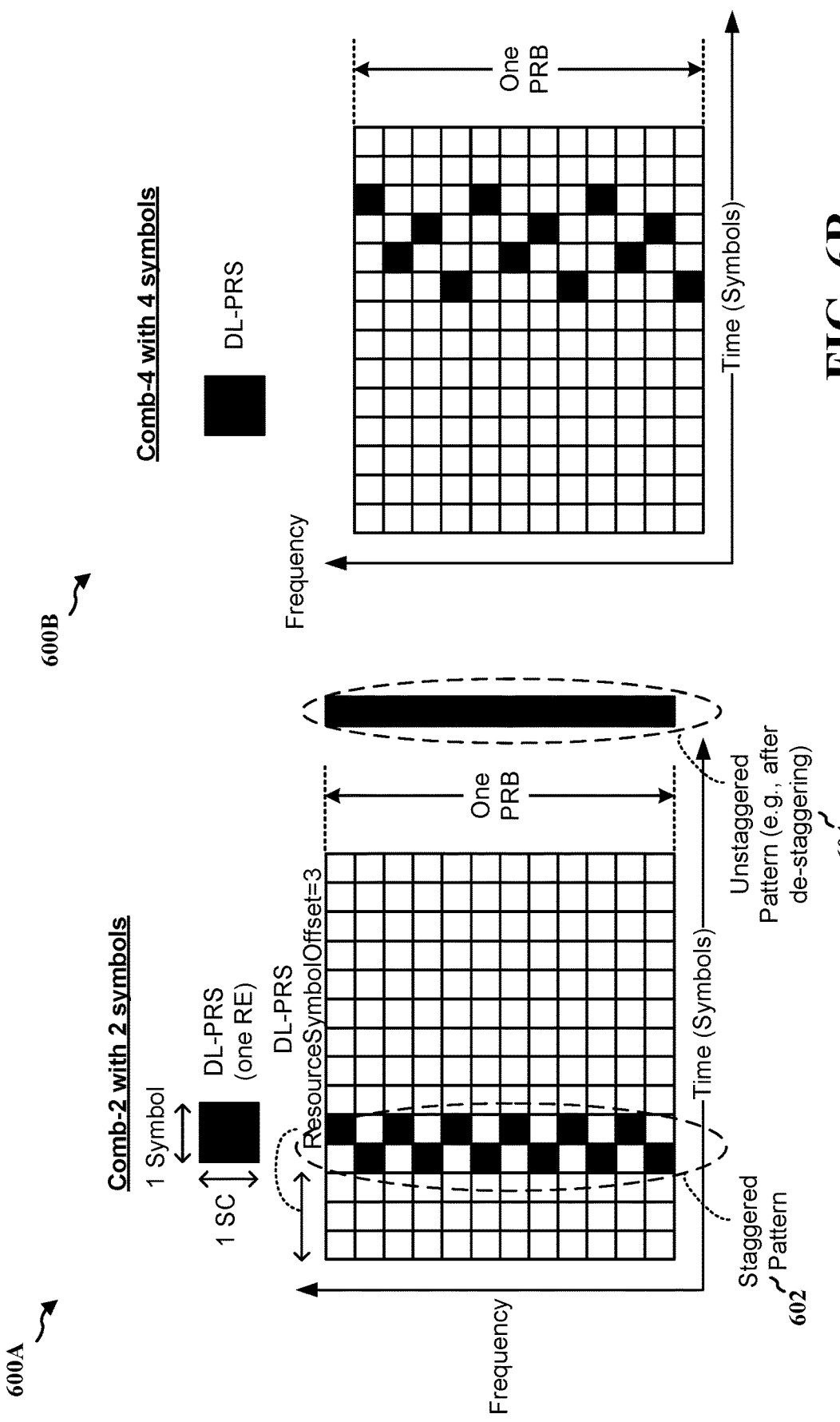
FIG. 6A is a diagram illustrating an example DL-PRS resource pattern in accordance with various aspects of the present disclosure.
FIG. 6B is a diagram illustrating an example DL-PRS resource pattern in accordance with various aspects of the present disclosure.

The patterns illustrated by the diagrams 600A to 600H may be referred to as "staggered pattern" or a "frequency-domain staggered pattern," where the resource elements on which the DL-PRS are transmitted may be staggered in the frequency domain of a given bandwidth such that these resource elements are not adjacent to each other in two consecutive resource elements on the given bandwidth. In addition, while the resource elements on which the DL-PRS are transmitted may be staggered over multiple symbols, the resource elements may occupy the whole bandwidth if they are de-staggered. For example, diagram 600A of FIG. 6A illustrates an example DL-PRS resource based on a comb-2 with 2 symbols pattern, where there is one PRS resource element per every two subcarriers in the frequency domain for two occupying symbols, such as shown at 602. In addition, a set of frequency offsets may be applied to the PRS resource elements in each of the occupying symbols. For example, a frequency offset of {0, 1} may be applied to the comb-2 with 2 symbols pattern, where PRS resource elements on the first occupying symbol may be transmitted with an offset of zero (0) and PRS resource elements on the second occupying symbol may be transmitted with an offset of one (1). As such, the PRS resource elements may also not be adjacent to each other on the time domain. As shown at 604, while the PRS resource elements may be staggered in a given bandwidth (and also on a given time domain), after a UE receives these PRS resource elements, the UE may still able to receive the full bandwidth of the PRS, which may be referred to as de-staggering a staggered pattern or turning a staggered pattern to an unstaggered pattern.

Figures 6C, 6D:
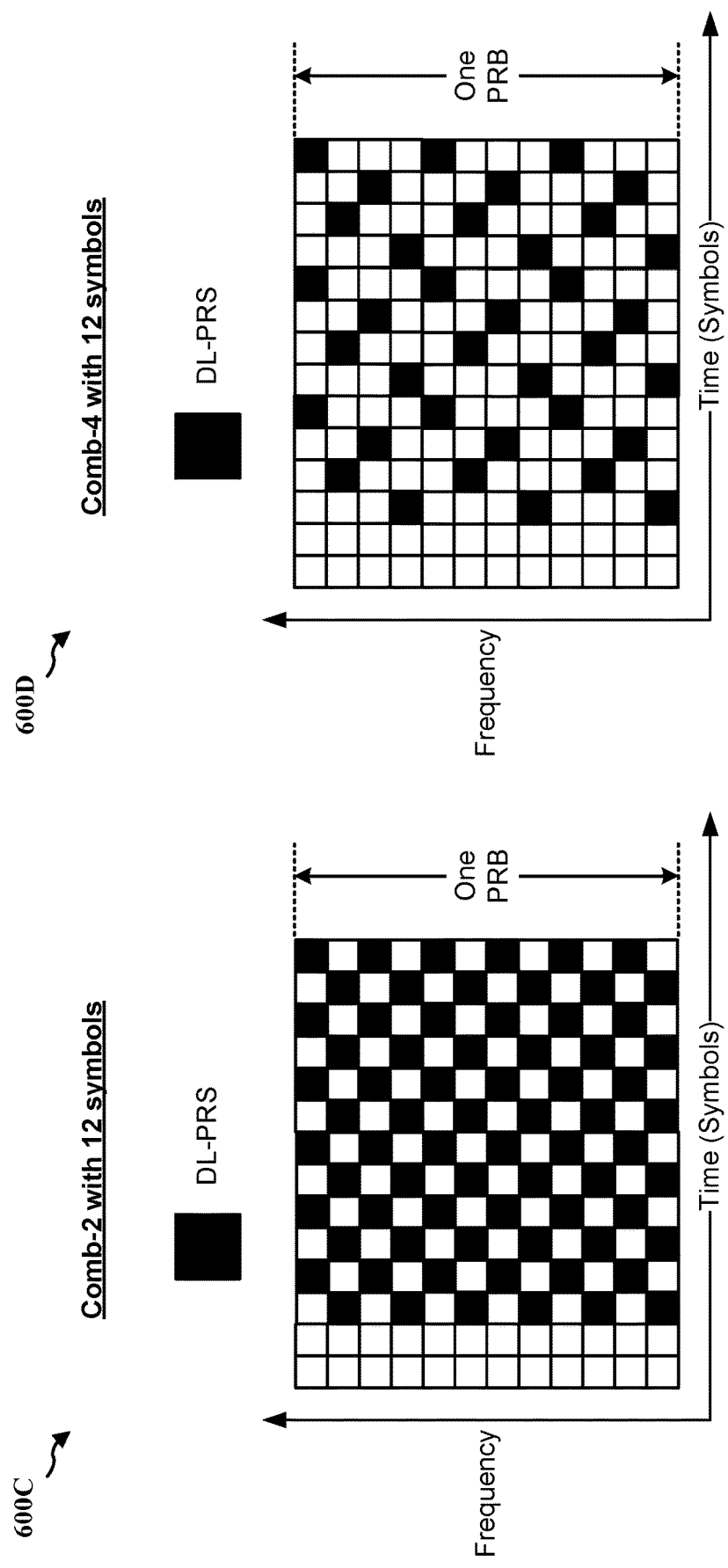
FIG. 6C is a diagram illustrating an example DL-PRS resource pattern in accordance with various aspects of the present disclosure.
FIG. 6D is a diagram illustrating an example DL-PRS resource pattern in accordance with various aspects of the present disclosure.
Figures 6G, 6H:
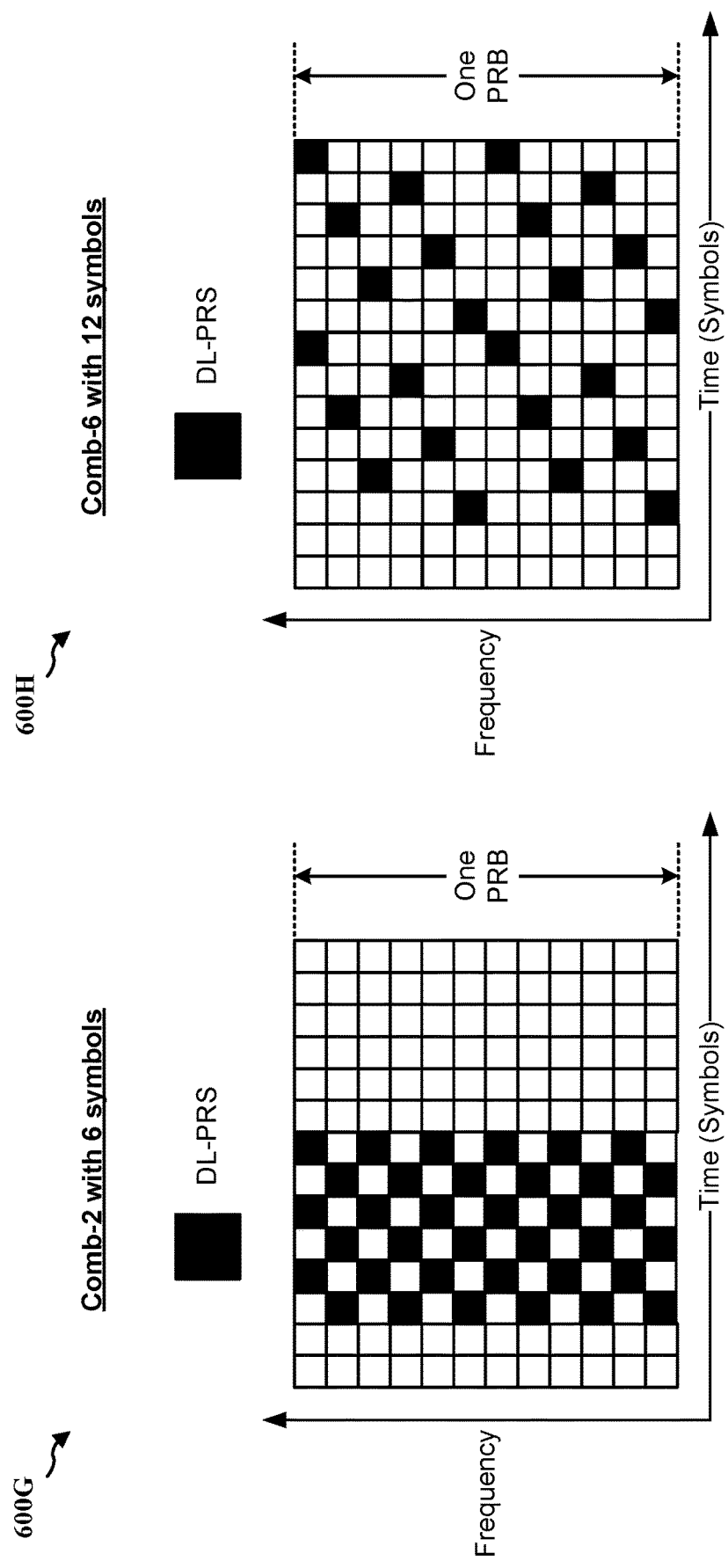
FIG. 6G is a diagram illustrating an example DL-PRS resource pattern in accordance with various aspects of the present disclosure.
FIG. 6H is a diagram illustrating an example DL-PRS resource pattern in accordance with various aspects of the present disclosure.

Similarly, diagram 600B of FIG. 6B illustrates an example DL-PRS resource based on a comb-4 with 4 symbols pattern, where there is one PRS resource element per every four subcarriers in the frequency domain for four occupying symbols and the pattern may include a frequency offset of {0, 2, 1, 3}. Diagram 600C of FIG. 6C illustrates an example DL-PRS resource based on a comb-2 with 12 symbols pattern, where there is one PRS resource element per every two subcarriers in the frequency domain for twelve occupying symbols and the pattern may include a frequency offset of {0, 1, 0, 1, 0, 1, 0, 1, 0, 1, 0, 1}. Diagram 600D of FIG. 6D illustrates an example DL-PRS resource based on a comb-4 with 12 symbols pattern, where there is one PRS resource element per every four subcarriers in the frequency domain for twelve occupying symbols and the pattern may include a frequency offset of {0, 2, 1, 3, 0, 2, 1, 3, 0, 2, 1, 3}. Diagram 600E of FIG. 6E illustrates an example DL-PRS resource based on a comb-6 with 6 symbols pattern, where there is one PRS resource element per every six subcarriers in the frequency domain for six occupying symbols and the pattern may include a frequency offset of {0, 3, 1, 4, 2, 5}. Diagram 600F of FIG. 6F illustrates an example DL-PRS resource based on a comb-12 with 12 symbols pattern, where there is one PRS resource element per every twelve subcarriers in the frequency domain for twelve occupying symbols and the pattern may include a frequency offset of {0, 6, 3, 9, 1, 7, 4, 10, 2, 8, 5, 11}. Diagram 600G of FIG. 6G illustrates an example DL-PRS resource based on a comb-2 with 6 symbols pattern, where there is one PRS resource element per every two subcarriers in the frequency domain for six occupying symbols and the pattern may include a frequency offset of {0, 1, 0, 1, 0, 1}. Diagram 600H of FIG. 6H illustrates an example DL-PRS resource based on a comb-6 with 12 symbols pattern, where there is one PRS resource element per every six subcarriers in the frequency domain for twelve occupying symbols and the pattern may include a frequency offset of {0, 3, 1, 4, 2, 5, 0, 3, 1, 4, 2, 5}.

Figure 7:
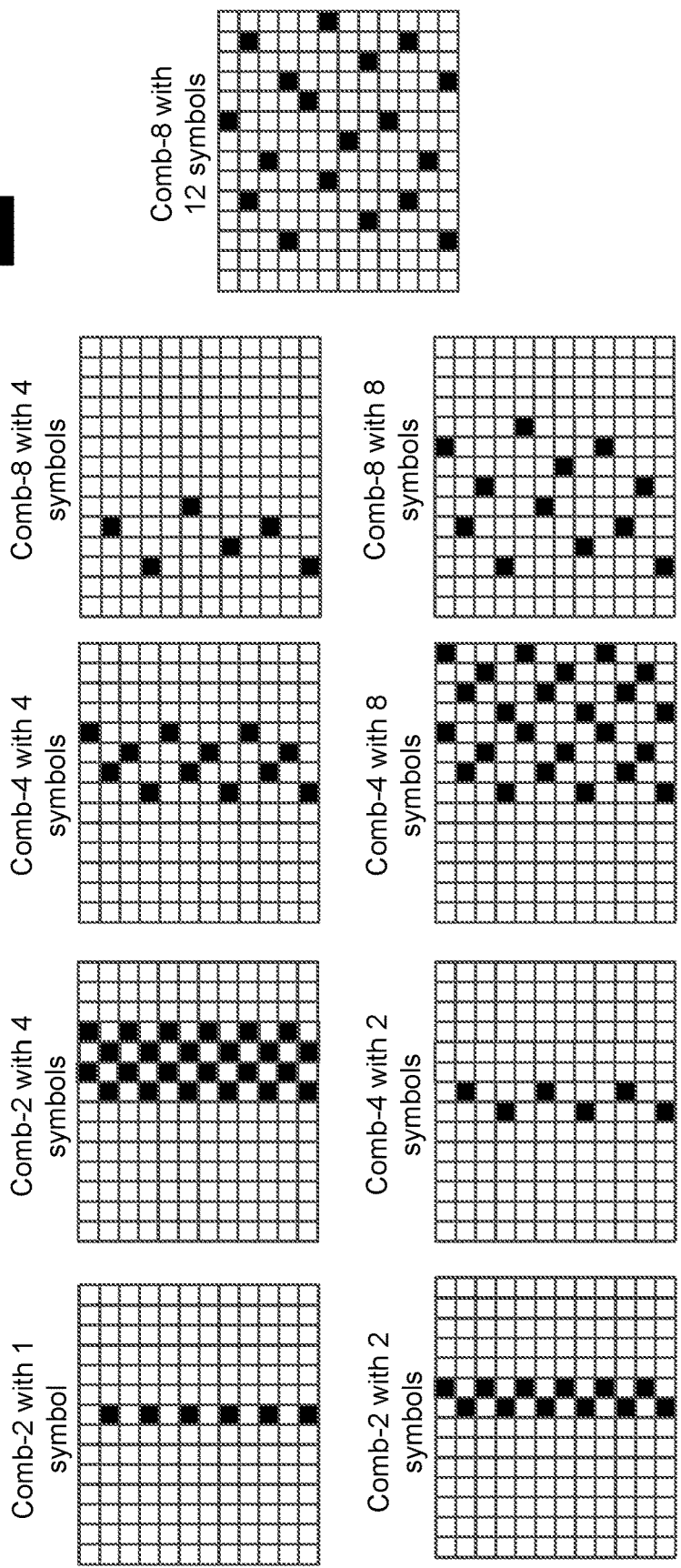
FIG. 7 is a diagram illustrating example patterns of UL-SRS resource within a slot in accordance with various aspect of the present disclosure.

The staggering pattern may also apply to the UL-SRS. For example, FIG. 7 is a diagram 700 illustrating example patterns of UL-SRS resource within a slot in accordance with various aspect of the present disclosure. The following may be the frequency offsets from symbol to symbol for comb sizes 2, 4, and 8 over 1, 2, 4, 8, and 12 symbols. 1-symbol comb-2: {0}; 2-symbol comb-2: {0, 1}; 2-symbol comb-2: {0, 1}; 4-symbol comb-2: {0, 1, 0, 1}; 2-symbol comb-4: {0, 2}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}, etc.

As shown by FIGS. 6A to 6H and 7, in some examples, both DL-RPS and UL-SRS for positioning may include specific resource elements mapping patterns. For the comb pattern in the frequency domain, power may be boosted per resource element for higher positioning coverage/range, and the comb size (e.g., the density of REs) may be configurable, e.g., Comb-2, Comb-4, Comb-6, and Comb-12, etc. The staggered comb offset may apply across symbols, such that after de-staggering, the energy of multiple symbols may be combined for higher coverage/range. In some examples, after de-staggering, the combined symbols may also become a comb-1, such as shown by 604 of FIG. 6A, which may provide a higher positioning range (e.g., by avoiding spatial aliasing).

Figures 8A, 8B:
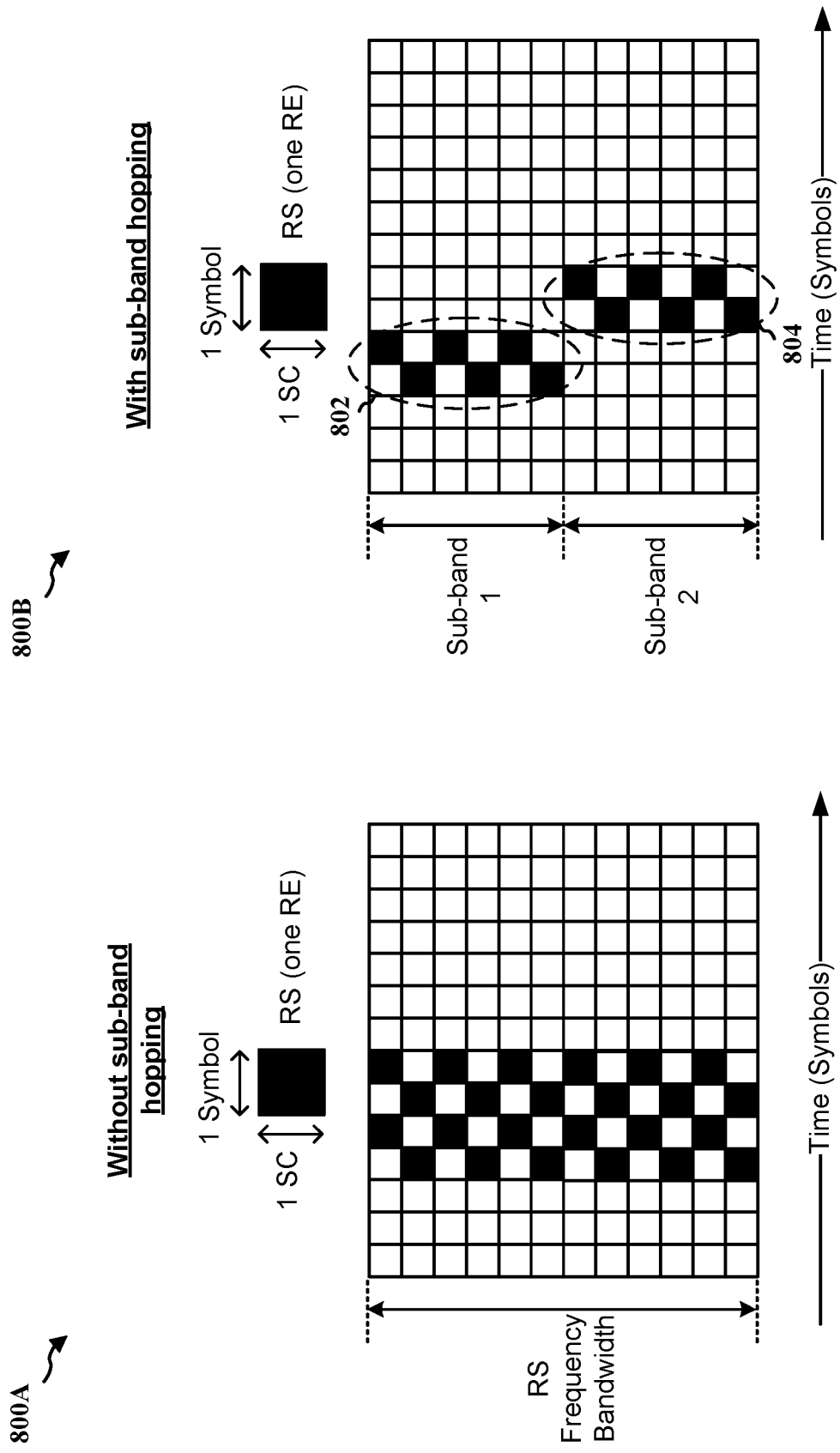
FIG. 8A is a diagram illustrating an example RS resource pattern based on a comb-4 with 4 symbols pattern without frequency hopping in accordance with various aspects of the present disclosure.
FIG. 8B is a diagram illustrating an example RS resource pattern with frequency hopping in accordance with various aspects of the present disclosure.

In some scenarios, to enhance reference signals used for positioning, sub-band hopping may be applied to the positioning RS resource elements. As with a smaller sub-band size, power of each resource element may further be boosted. Thus, in some scenarios, compared to the repetition of reference signals, sub-band hopping may achieve the same coverage with a lower resource overhead (e.g., a smaller number of total resource elements may be used). For examples, FIG. 8A is a diagram 800A illustrating an example RS resource pattern based on a comb-4 with 4 symbols pattern without frequency hopping, where there may be one RS resource element per every two subcarriers in the frequency domain for four occupying symbols and the pattern may include a frequency offset of {0, 1, 0, 1}. The RS may be a signal associated with positioning, such as a PRS, an SRS, or a sidelink RS. In this example, the RS resource may occupy a total of 24 RS resource elements.

FIG. 8B is a diagram 800B illustrating an example RS resource pattern with frequency hopping in accordance with various aspects of the present disclosure. Instead of transmitting RS resource elements using a given full RS frequency bandwidth for each symbol, a transmitting device may be configured to transmit RS resource elements in a first sub-band and a second sub-band of the RS frequency bandwidth using different time slots and based on frequency hopping to reduce the number of RS resource elements transmitted. For example, as shown at 802, the transmitting device may transmit RS resource elements on the first sub-band (Sub-band 1) using the first two symbols based on a comb-2 with 2 symbols pattern, and as shown at 804, the transmitting device may transmit RS resource elements on the second sub-band (Sub-band 2) using the next two symbols based on frequency hopping (e.g., also based on a comb-2 with 2 symbols pattern). As such, the RS resource element in this example may occupy a total of 12 RS resource elements. Although there may be a lesser number of RS resource elements transmitted, a smaller sub-band size may enable the power of each resource element be further boosted. Thus, the RS transmission with sub-band hopping shown by FIG. 8B may achieve the same or similar coverage as RS transmission without sub-band hopping shown by FIG. 8A but with a lower resource overhead.

While a staggered pattern may enable a receiving device to receive an RS via a full frequency bandwidth configured for the RS (e.g., after de-staggering), the staggered pattern (with or without sub-band hopping) may still specify a transmitting device to transmit the RS using a high number of RS resource elements. For example, in some scenarios, the staggered pattern may use more resource overhead as the number of symbols per resource may be specified to be larger than the comb size, e.g., at least 2 symbols for Comb-2, 4 symbols for Comb-4, etc. In other words, for comb-N PRS/SRS, at least N (or multiples of N if repetition is configured) symbols may be specified for a transmitting device. The staggered pattern may also have a longer positioning latency as more time may be specified for a receiving device to receive and process the RS symbols.

Aspects presented herein may improve UE positioning by providing enhanced resource patterns that may reduce positioning latency and resource overhead for the UE positioning. Aspects presented herein may provide enhanced resource patterns for positioning reference signals that may not be based on a staggered pattern. For example, in some positioning scenarios, as a UE may have a rough knowledge of its position (e.g., based on previous positioning session or other sensors), a higher positioning range may not be specified for the positioning scenarios. In other words, a resource pattern with less resource elements and not based on a staggered pattern may be used by a transmitting device (e.g., a TRP, a UE, etc.) to achieve the same or similar positioning performance and accuracy as a resource pattern based on a staggered pattern.

In one aspect of the present disclosure, a resource pattern for a positioning RS (e.g., a PRS, an SRS, an RS used by sidelink, etc.) may be configured to have comb-N with less than N symbols, such that less resources may be used in a positioning session (e.g., for DL and UL positioning, and/or UE-UTRAN (Uu) and SL positioning, etc.). For example, a comb-4 RS may use one or two symbols instead of four symbols. In another aspect of the present disclosure, a sub-band-based comb offset hopping may also be applied to a resource pattern for transmitting a positioning RS, where the bandwidth of the positioning RS may be divided into multiple smaller sub-bands and each sub-band may be configured with a sub-band-specific comb offset. This may at least partially compensate the positioning performance loss from not using a staggered RS resource pattern. As such, each sub-band of the positioning RS may be transmitted on the same symbol (e.g., OFDM symbol) or on different symbols, e.g., based on sub-band frequency hopping.

Figure 9:
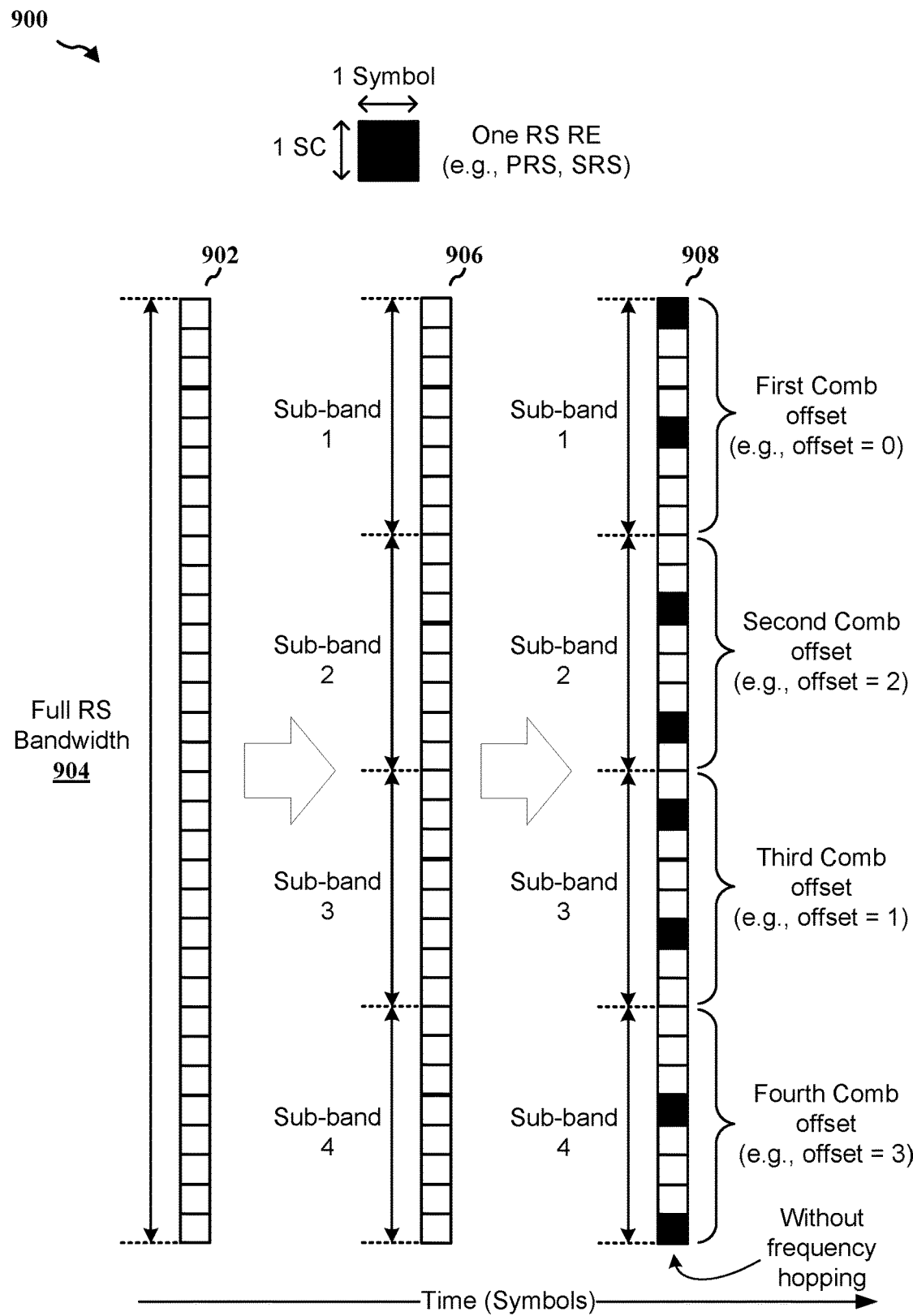
FIG. 9 is a diagram illustrating an example RS resource pattern with sub-band-based comb offset in accordance with various aspects of the present disclosure.

FIG. 9 is a diagram 900 illustrating an example RS resource pattern with sub-band-based comb offset in accordance with various aspects of the present disclosure. The RS resource pattern may be used in association with UE positioning (e.g., for DL and UL positioning, and/or Uu and SL positioning, etc.), such as for PRS transmitted from a TRP or SRS transmitted from a UE, etc.

In one example, as shown at 902, an RS (e.g., PRS, SRS, etc.) used for positioning may be configured with a full RS bandwidth 904, where a transmitting device may use one or more subcarriers within the full RS bandwidth 904 for transmitting the RS.

As shown at 906, a transmitting device (e.g., a TRP, a UE, etc.) may be configured to divide the full RS bandwidth 904 into multiple sub-bandwidths (hereafter sub-bands). For example, the transmitting device may be configured (e.g., by a serving base station or an LMF) to divide the full RS bandwidth 904 into four sub-bands: a first sub-band (Sub-band 1), a second sub-band (Sub-band 2), a third sub-band (Sub-band 3), and a fourth sub-band (Sub-band 4) (collectively referred to as "the sub-bands"). In some configurations, each of the sub-bands may be equal in bandwidth, and in other configurations, the sub-bands may have different bandwidths (e.g., some sub-bands may have a wider bandwidth than other sub-bands).

Then, as shown at 908, the transmitting device may further be configured to apply a comb offset to each of the sub-bands (which may be referred to as a "sub-band specific comb offset" or a "sub-band comb offset"). For example, a comb-4 configuration may be applied to the sub-bands, where the first sub-band may be configured with a first sub-band comb offset (e.g., sub-band comb offset=0), the second sub-band may be configured with a second sub-band comb offset (e.g., sub-band comb offset=2), the third sub-band may be configured with a third comb offset (e.g., sub-band comb offset=1), and the fourth sub-band may be configured with a fourth sub-band comb offset (e.g., sub-band comb offset=3), etc. In other words, the comb-4 configuration may be associated with a sub-band comb offset pattern of $\{0, 2, 1, 3\}$.

In some examples, the transmitting device may be configured to select a sub-band comb offset pattern from a plurality of sub-band comb offset patterns. In other examples, the transmitting device may be configured to apply a pre-determined/configured sub-band comb offset pattern. For example, for the comb-4 configuration, there may be 24 possible combinations: $\{0, 1, 2, 3\}$, $\{0, 1, 3, 2\}$, $\{0, 2, 1, 3\}$, $\{0, 2, 3, 1\}$, $\{0, 3, 1, 2\}$, $\{0, 2, 1, 3\}$, ..., etc. Thus, if the transmitting device is configured to apply the comb-4 configuration for RS transmission, the transmission device may be configured to apply a predefined sub-band comb offset pattern (e.g., the $\{0, 2, 1, 3\}$), or to select one sub-band comb offset pattern from all possible sub-band comb offset patterns (e.g., from the 24 possible combinations), or to select one sub-band comb offset pattern from a set of pre-determined/configured sub-band comb offset patterns. For example, the set of pre-determined/configured sub-band comb offset patterns may correspond to staircase patterns for comb-4: $\{0, 1, 2, 3\}$, $\{1, 2, 3, 0\}$, $\{2, 3, 0, 1\}$, $\{3, 0, 1, 2\}$, $\{3, 2, 1, 0\}$, etc., where there may be a constant increment (e.g., +1) or decrement (e.g., −1) between two adjacent offsets except for the highest and the lowest offset (e.g., once the offset reaches 3, it goes back to 0, or once the offset reaches 0, it goes back to 3, etc.). In another example, the set of pre-determined/configured sub-band comb offset patterns may correspond to Costas array patterns for comb-4: $\{0, 1, 3, 2\}$, $\{0, 2, 3, 1\}$, $\{0, 3, 1, 2\}$, $\{1, 0, 2, 3\}$, $\{1, 2, 0, 3\}$, $\{1, 3, 2, 0\}$, $\{2, 0, 1, 3\}$, $\{2, 1, 3, 0\}$, $\{2, 3, 1, 0\}$, $\{3, 0, 2, 1\}$, $\{3, 1, 0, 2\}$, $\{3, 2, 0, 1\}$, etc. A Costas array may be an n×n array of dots and blanks with exactly one dot in each row and column, and with distinct vector differences between all pairs of dots. For example, for the sub-band comb offset pattern $\{0, 1, 3, 2\}$, there is a first vector difference of positive one (+1) between the first vector and the second vector, there is a second vector difference of positive two (+2) between the second vector and the third vector, and there is a third vector difference of negative one (−1) between the third vector and the fourth vector, etc.

Figures 12A, 12B:
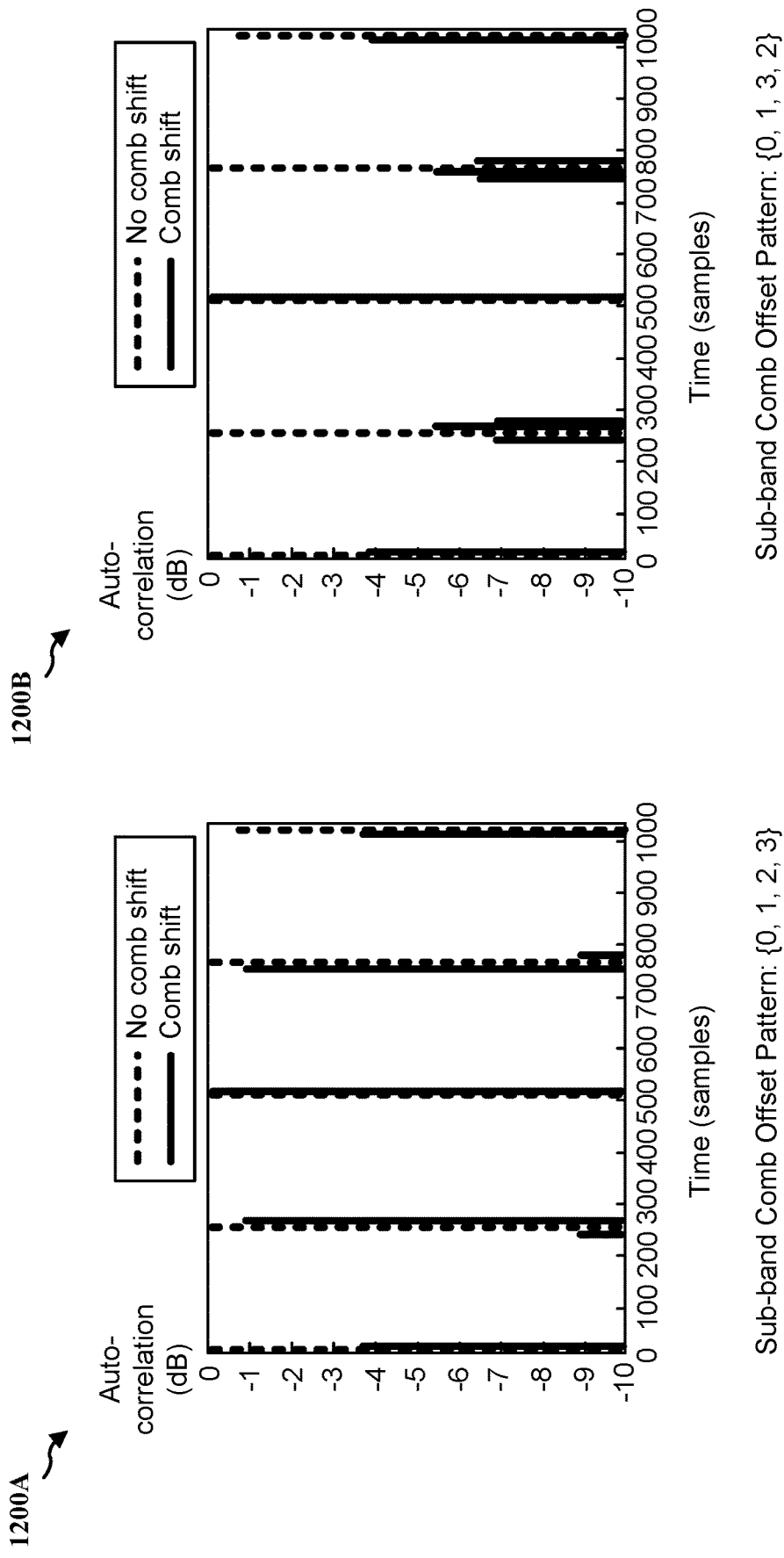
FIG. 12A is a diagram illustrating an example of auto-correlation of RS with sub-band-based comb offset (and frequency hopping) according to aspects of the present disclosure.
FIG. 12B is a diagram illustrating an example of auto-correlation of RS with sub-band-based comb offset (and frequency hopping) according to aspects of the present disclosure.

In some examples, the auto-correlation property of RS may depend on the sub-band comb offset patterns. FIGS. 12A and 12B are diagrams 1200A and 1200B illustrating examples of auto-correlation of RS with sub-band-based comb offset (and frequency hopping) according to aspects of the present disclosure. The diagram 1200A is based on a staircase pattern for comb-4 (e.g., $\{0, 1, 2, 3\}$), where the main auto-correlation peak at around sample 512 may be approximately 1 dB larger than the other false peaks. On the other hand, the diagram 1200B is based on a Costas array pattern for comb-4 (e.g., $\{0, 1, 3, 2\}$), where the main auto-correlation peak at around sample 512 may be approximately at least 4 dB larger than the other false peaks. If all sub-bands have the same comb offset, e.g., $\{0, 0, 0, 0\}$, the main and false peaks may have the same magnitude which may make them indistinguishable. As such, in some scenarios, Costas array patterns may provide a better positioning performance than staircase patterns.

In one aspect of the present disclosure, the transmitting device may transmit all of the sub-bands within a same time duration, such as on the same symbol (e.g., OFDM symbol), such as shown at 908 of FIG. 9 where all the sub-bands (or RS resource elements within the sub-bands) may be transmitted by the transmitting device on the same symbol. In another aspect of the present disclosure, to improve positioning performance, a frequency hopping pattern may be applied to the sub-bands, where the sub-bands may be transmitted at different symbols.

Figure 10:
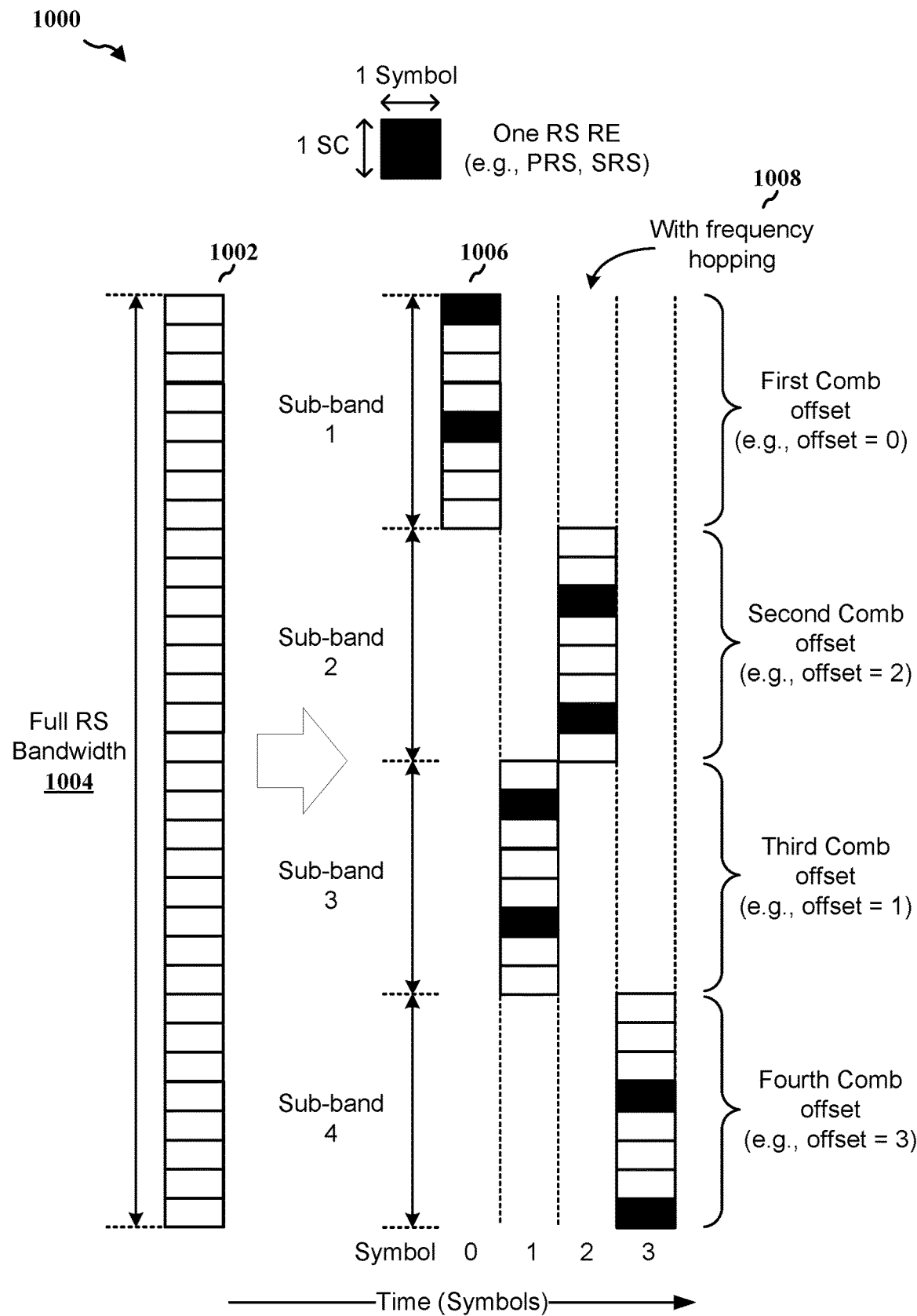
FIG. 10 is a diagram illustrating an example RS resource pattern with sub-band-based comb offset and frequency hopping in accordance with various aspects of the present disclosure.

FIG. 10 is a diagram 1000 illustrating an example RS resource pattern with sub-band-based comb offset and frequency hopping in accordance with various aspects of the present disclosure. The RS resource pattern may be used in association with UE positioning (e.g., for DL and UL positioning, and/or Uu and SL positioning, etc.), such as for PRS transmitted from a TRP or SRS transmitted from a UE, etc.

In one example, as shown at 1002, an RS (e.g., PRS, or SRS, etc.) used for positioning may be configured with a full RS bandwidth 1004, where a transmitting device may use one or more subcarriers within the full RS bandwidth 1004 for transmitting the RS. Then, as shown at 1006, the transmitting device (e.g., a TRP, a UE, etc.) may be configured to divide the full RS bandwidth 1004 into multiple sub-bandwidths (hereafter sub-bands). For example, the transmitting device may be configured (e.g., by a serving base station or an LMF) to divide the full RS bandwidth 1004 into four sub-bands: a first sub-band (Sub-band 1), a second sub-band (Sub-band 2), a third sub-band (Sub-band 3), and a fourth sub-band (Sub-band 4) (collectively as "the sub-bands"). In some configurations, each of the sub-bands may be equal in bandwidth, and in other configurations, the sub-bands may have different bandwidths (e.g., some sub-bands may have a wider bandwidth than other sub-bands). Similarly, the transmitting device may further be configured to apply a comb offset to each of the sub-bands. For example, a comb-4 configuration may be applied to the sub-bands, where the first sub-band may be configured with a first sub-band comb offset (e.g., sub-band comb offset=0), the second sub-band may be configured with a second sub-band comb offset (e.g., sub-band comb offset=2), the third sub-band may be configured with a third comb offset (e.g., sub-band comb offset=1), and the fourth sub-band may be configured with a fourth sub-band comb offset (e.g., sub-band comb offset=3), etc. In some examples, the transmitting device may be configured to select a sub-band comb offset pattern from a plurality of sub-band comb offset patterns (e.g., from all possible combinations, from a set of staircase patters, or from a set of Costas array patterns, etc.), and in other examples, the transmitting device may be configured to apply a pre-determined/configured sub-band comb offset pattern, such as described in connection with FIG. 9.

In addition, as shown at 1008, the transmitting device may also be configured (e.g., by the network, a location server, an LMF, and/or a base station, etc.) to transmit the sub-bands based on a frequency hopping pattern. In other words, the transmitting device may transmit each sub-band using at a different time. For example, the transmitting device may transmit the first sub-band (or RS resource elements within the first sub-band) at a first symbol (e.g., symbol 0), transmit the third sub-band (or RS resource elements within the third sub-band) at a second symbol (e.g., symbol 1), transmit the second sub-band (or RS resource elements within the second sub-band) at a third symbol (e.g., symbol 2), and transmit the fourth sub-band (or RS resource elements within the fourth sub-band) at a third symbol (e.g., symbol 3), etc.

In some examples, the frequency hopping pattern and/or the sub-band comb offset pattern may be configured by the network (e.g., a location server, a base station, an LMF, etc.). In other examples, the frequency hopping pattern may be configured to be a function of time (e.g., based on system frame number, subframe, slot, symbol, etc.) and/or frequency (e.g., carrier, bandwidth part, sub-band, etc.). For example, if a first system frame number, subframe, slot, or symbol is used, then a transmitting device may be configured to apply a first frequency hopping pattern and/or a first sub-band comb offset pattern, and if a second system frame number, subframe, slot, or symbol is used, then the transmitting device may be configured to apply a second frequency hopping pattern and/or a first sub-band comb offset pattern, etc. For example, a comb offset at symbol k may be configured to be $v(k)=(\text{start\_offset}+\text{step}\cdot k) \bmod N$, where N may represent the comb size, and the start_offset and step may be configured parameters. In another example, if a first carrier, bandwidth part, or sub-band is used, then a transmitting device may be configured to apply a first frequency hopping pattern and/or a first sub-band comb offset pattern, and if a second carrier, bandwidth part, or sub-band is used, then the transmitting device may be configured to apply a second frequency hopping pattern and/or a first sub-band comb offset pattern, etc.

Figure 11:
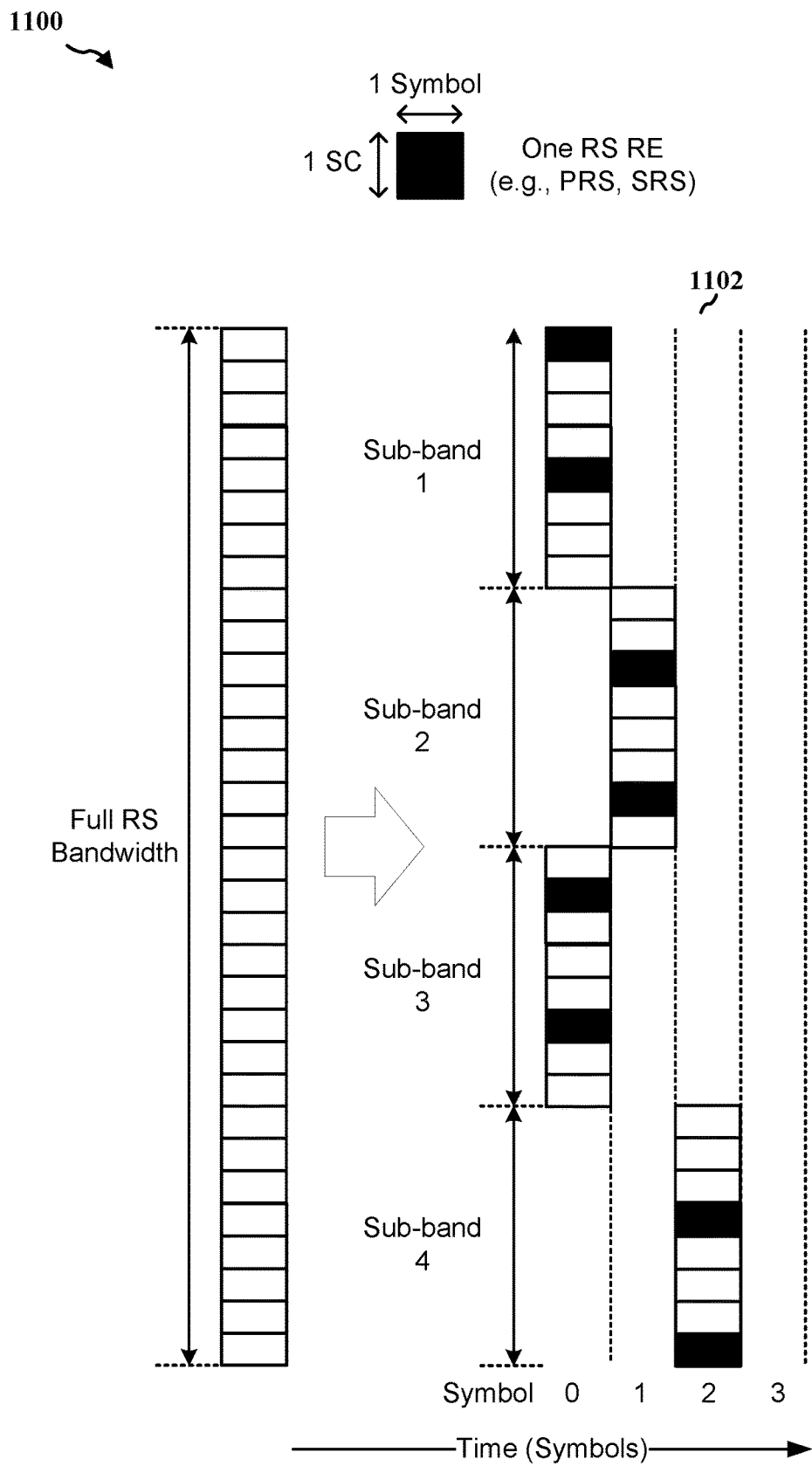
FIG. 11 is a diagram illustrating an example RS resource pattern with sub-band-based comb offset and frequency hopping in accordance with various aspects of the present disclosure.

In another example, as shown by a diagram 1100 of FIG. 11, a transmitting device may also transmit N sub-bands using more than one symbol and less than N symbols. In other words, the transmitting device may transmit some of the sub-bands using one symbol, and some of the sub-bands using another symbol. For example, as shown at 1102, a transmitting device may transmit the first sub-band and the third sub-band (or RS resource elements within the first sub-band and the third sub-band) at a first symbol (e.g., symbol 0), transmit the second sub-band at a second symbol (e.g., symbol 1), and transmit the fourth sub-band at a third symbol (e.g., symbol 2), etc.

Figure 13:
FIG. 13 is a flowchart of a method of wireless communication in accordance with aspects presented herein.

FIG. 13 is a flowchart 1300 of a method of wireless communication. The method may be performed by a transmitter or a component of a transmitter (e.g., the base station 102, 180, 310; the UE 104, 404; the TRP 402; the apparatus 1402; a processing system, which may include the memory 376 and which may be the entire base station 310 or a component of the base station 310, such as the TX processor 316 the RX processor 370, and/or the controller/processor 375; a processing system, which may include the memory 360 and which may be the entire UE 350 or a component of the UE 350, such as the TX processor 368, the RX processor 356, and/or the controller/processor 359). The method may enable the transmitter to transmit reference signals associated with UE positioning with an enhanced resource patterns to conserve signaling overhead and radio resources.

At 1302, the transmitter may divide a reference signal associated with UE positioning into a plurality of sub-bandwidths, each of the plurality of sub-bandwidths being associated with a comb offset, such as described in connection with FIGS. 9 to 12. For example, as shown by the FIG. 9, a transmitter may divide a full RS bandwidth 904 into four sub-bandwidths (e.g., sub-bands 1 to 4), and each sub-bandwidth may be associated with a comb offset. The division of the reference signal and the association of the comb offset may be performed by, e.g., the bandwidth division and offset configuration component 1440 of the apparatus 1402 in FIG. 14.

In one example, the reference signal may be a DL PRS or an UL SRS.

In another example, the comb offset for each of the plurality of sub-bandwidths may be different.

In another example, the plurality of sub-bandwidths may be transmitted within a same time period.

In another example, each of the plurality of sub-bandwidths may be transmitted at a different time period based on a frequency hopping pattern. In such an example, the transmitter may receive, from a network entity, a configuration for the frequency hopping pattern and the comb offset for each of the plurality of sub-bandwidths. In such an example, the network entity may include at least one of a location server, an LMF, or a base station. In such an example, the frequency hopping pattern may be based on at least one of time or frequency. In such an example, the frequency hopping pattern may be selected from a set of predefined frequency hopping patterns.

In another example, at least some of the plurality of sub-bandwidths may be transmitted at different time periods.

At 1304, the transmitter may transmit, to a receiver, the reference signal via the plurality of sub-bandwidths, such as described in connection with FIGS. 9 to 12. For example, as shown by FIG. 9, a transmitter may transmit the RS in four sub-bandwidths. The transmission of the reference signal via a plurality of sub-bandwidths may be performed by, e.g., the sub-bandwidth configuration component 1442 and/or the transmission component 1434 of the apparatus 1402 in FIG. 14.

In one example, the transmitter may be a base station and the receiver may be a UE. Alternatively, the transmitter may be a UE and the receiver may be a base station.

Figure 14:
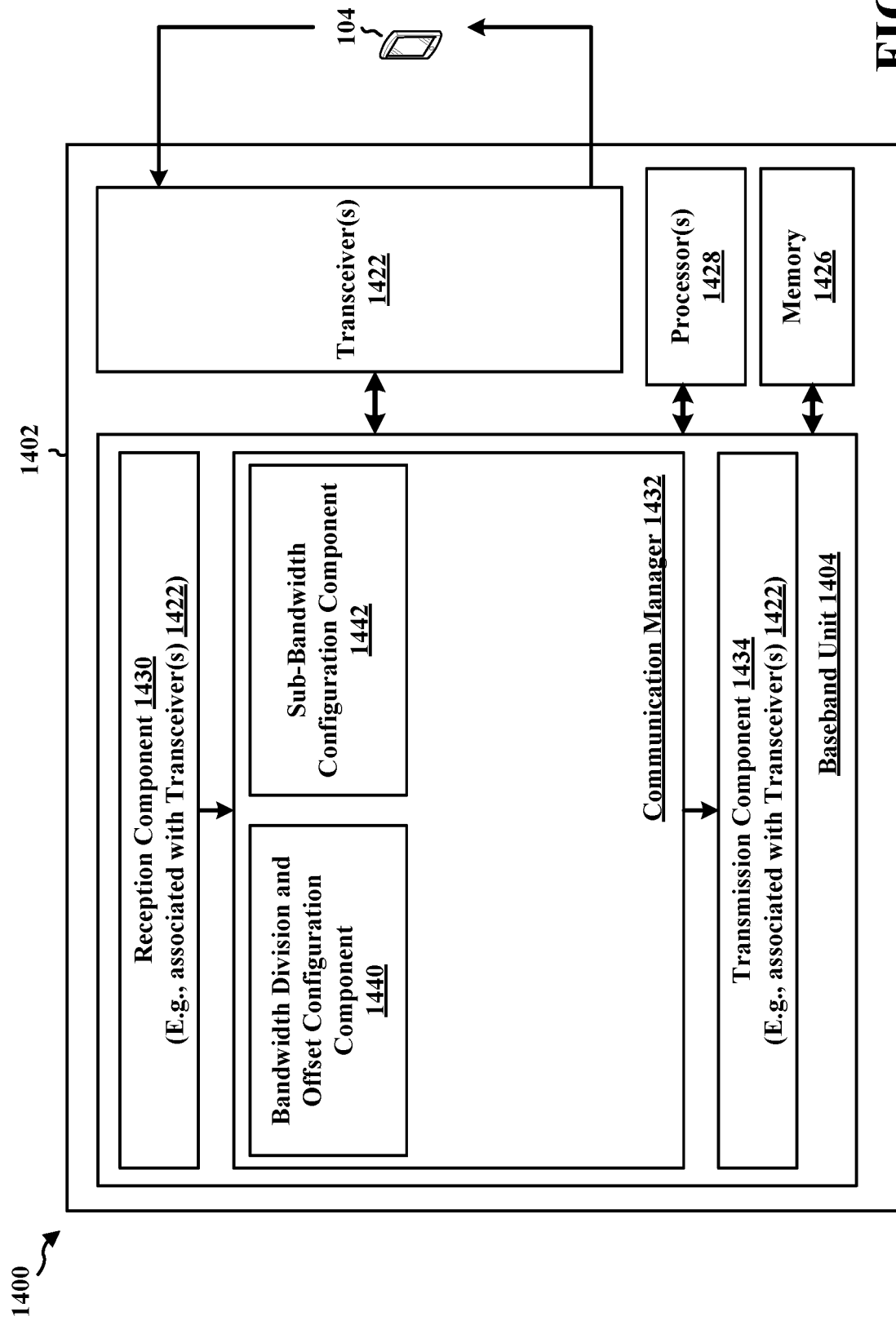
FIG. 14 is a diagram illustrating an example of a hardware implementation for an example apparatus in accordance with aspects presented herein.

FIG. 14 is a diagram 1400 illustrating an example of a hardware implementation for an apparatus 1402. In one example, the apparatus 1402 may be a base station, a component of a base station, or may implement base station functionality. In another example, the apparatus 1402 may be a UE, a component of a UE, or may implement UE functionality. In some aspects, the apparatus 1402 may include a baseband unit 1404. The baseband unit 1404 may communicate through at least one transceiver 1422 (e.g., one or more RF transceivers and/or antennas) with a receiver. The at least one transceiver 1422 may be associated with or include a reception component 1430 and/or a transmission component 1434. The baseband unit 1404 may include a computer-readable medium/memory (e.g., a memory 1426). The baseband unit 1404 and/or the at least one processor 1428 may be responsible for general processing, including the execution of software stored on the computer-readable medium/memory. The software, when executed by the baseband unit 1404 and/or the at least one processor 1428, causes the baseband unit 1404 and/or the at least one processor 1428 to perform the various functions described supra. The computer-readable medium/memory may also be used for storing data that is manipulated by the baseband unit 1404 when executing software. The baseband unit 1404 further includes the reception component 1430, a communication manager 1432, and the transmission component 1434. The reception component 1430 and the transmission component 1434 may, in a non-limiting example, include at least one transceiver and/or at least one antenna subsystem. The communication manager 1432 includes the one or more illustrated components. The components within the communication manager 1432 may be stored in the computer-readable medium/memory and/or configured as hardware within the baseband unit 1404. The baseband unit 1404 may be a component of the base station and may include the memory 376 and/or at least one of the TX processor 316, the RX processor 370, and the controller/processor 375, or may be a component of the UE 350 and may include the memory 360 and/or at least one of the TX processor 368, the RX processor 356, and the controller/processor 359.

The communication manager 1432 includes a bandwidth division and offset configuration component 1440 that divides a reference signal associated with UE positioning into a plurality of sub-bandwidths, each of the plurality of sub-bandwidths being associated with a comb offset, e.g., as described in connection with 1302 of FIG. 13. The communication manager 1432 further includes a sub-bandwidth configuration component 1442 that transmits, to a receiver, the reference signal via the plurality of sub-bandwidths, e.g., as described in connection with 1304 of FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for dividing a reference signal associated with UE positioning into a plurality of sub-bandwidths, each of the plurality of sub-bandwidths being associated with a comb offset (e.g., the bandwidth division and offset configuration component 1440). The apparatus 1402 includes means for transmitting, to a receiver, the reference signal via the plurality of sub-bandwidths (e.g., the sub-bandwidth configuration component 1442 and/or the transmission component 1434).

In one configuration, the reference signal may be a DL PRS or an UL SRS.

In another configuration, the comb offset for each of the plurality of sub-bandwidths may be different.

In another configuration, the plurality of sub-bandwidths may be transmitted within a same time period.

In another configuration, each of the plurality of sub-bandwidths may be transmitted at a different time period based on a frequency hopping pattern. In such a configuration, the apparatus 1402 includes means for receiving, from a network entity, a configuration for the frequency hopping pattern and the comb offset for each of the plurality of sub-bandwidths. In such a configuration, the network entity may include at least one of a location server, an LMF, or a base station. In such a configuration, the frequency hopping pattern may be based on at least one of time or frequency. In such a configuration, the frequency hopping pattern may be selected from a set of predefined frequency hopping patterns.

In another configuration, at least some of the plurality of sub-bandwidths may be transmitted at different time periods.

In another configuration, the transmitter may be a base station and the receiver may be a UE. Alternatively, the transmitter may be a UE and the receiver may be a base station.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means. Alternatively, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
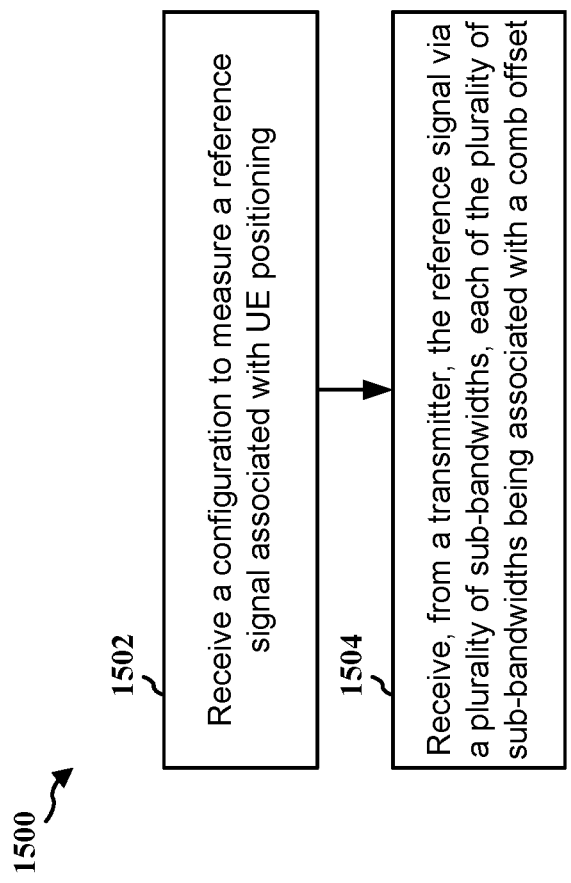
FIG. 15 is a flowchart of a method of wireless communication in accordance with aspects presented herein.

FIG. 15 is a flowchart 1500 of a method of wireless communication. The method may be performed by a receiver or a component of a receiver (e.g., the base station 102, 180, 310; the UE 104, 404; the TRP 402; the apparatus 1402; a processing system, which may include the memory 376 and which may be the entire base station 310 or a component of the base station 310, such as the TX processor 316 the RX processor 370, and/or the controller/processor 375; a processing system, which may include the memory 360 and which may be the entire UE 350 or a component of the UE 350, such as the TX processor 368, the RX processor 356, and/or the controller/processor 359). The method may enable the receiver to receive reference signals associated with UE positioning with an enhanced resource patterns to conserve signaling overhead and radio resources.

At 1502, the receiver may receive a configuration to measure a reference signal associated with UE positioning, such as described in connection with FIGS. 9 to 12. For example, as shown by the FIG. 9, a receiver may receive a configuration to measure an RS that is associated with a full RS bandwidth 904. The reception of the configuration may be performed by, e.g., the bandwidth division and offset configuration component 1640 of the apparatus 1602 in FIG. 16.

In one example, the reference signal may be a DL PRS or an UL SRS.

At 1504, the receiver may receive, from a transmitter, the reference signal via a plurality of sub-bandwidths, each of the plurality of sub-bandwidths being associated with a comb offset, such as described in connection with FIGS. 9 to 12. For example, as shown by FIG. 9, a receiver may receive the RS in four sub-bandwidths, where each sub-bandwidth may be associated with a comb offset. The reception of the reference signal via a plurality of sub-bandwidths may be performed by, e.g., the bandwidth division and offset process component 1642 and/or the reception component 1630 of the apparatus 1602 in FIG. 16.

In one example, the comb offset for each of the plurality of sub-bandwidths may be different.

In another example, the plurality of sub-bandwidths may be received within a same time period.

In another example, each of the plurality of sub-bandwidths may be received at a different time period based on a frequency hopping pattern. In such an example, the receiver may receive, from a network entity, a configuration for the frequency hopping pattern and the comb offset for each of the plurality of sub-bandwidths. In such an example, the network entity may include at least one of a location server, an LMF, or a base station. In such an example, the frequency hopping pattern may be based on at least one of time or frequency. In such an example, the frequency hopping pattern may be selected from a set of predefined frequency hopping patterns.

In another example, at least some of the plurality of sub-bandwidths may be received at different time periods.

In another example, the receiver may be a base station and the transmitter may be a UE. Alternatively, the receiver may be a UE and the transmitter may be a base station.

Figure 16:
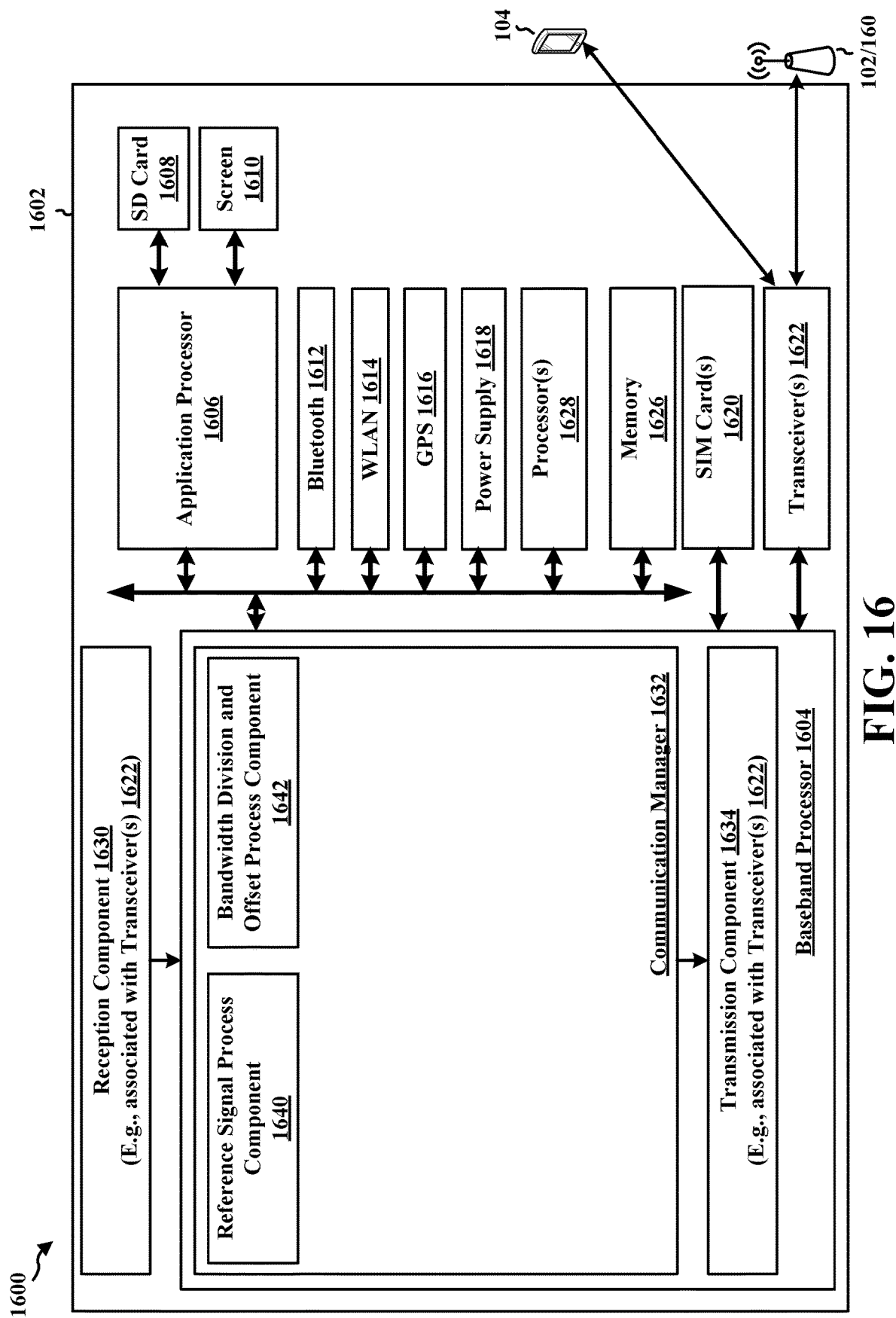
FIG. 16 is a diagram illustrating an example of a hardware implementation for an example apparatus in accordance with aspects presented herein.

FIG. 16 is a diagram 1600 illustrating an example of a hardware implementation for an apparatus 1602. In one example, the apparatus 1602 may be a UE, a component of a UE, or may implement UE functionality. In another example, the apparatus 1602 may be a base station, a component of a base station, or may implement base station functionality. In some aspects, the apparatus 1602 may include a baseband processor 1604 (also referred to as a modem) coupled to at least one transceiver 1622 (e.g., one or more RF transceivers and/or antennas). The at least one transceiver 1622 may be associated with or include a reception component 1630 and/or a transmission component 1634. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The baseband processor 1604 communicates through the at least one transceiver 1622 with the UE 104 and/or BS 102/180. The baseband processor 1604 may include a computer-readable medium/memory (e.g., a memory 1626). The computer-readable medium/memory may be non-transitory. The baseband processor 1604 and/or at least one processor 1628 is responsible for general processing, including the execution of software stored on the computer-readable medium/memory. The software, when executed by the baseband processor 1604 and/or the at least one processor 1628, causes the baseband processor 1604 and/or the at least one processor 1628 to perform the various functions described supra. The computer-readable medium/memory may also be used for storing data that is manipulated by the baseband processor 1604 when executing software. The baseband processor 1604 further includes the reception component 1630, a communication manager 1632, and the transmission component 1634. The reception component 1630 and the transmission component 1634 may, in a non-limiting example, include at least one transceiver and/or at least one antenna subsystem. The communication manager 1632 includes the one or more illustrated components. The components within the communication manager 1632 may be stored in the computer-readable medium/memory and/or configured as hardware within the baseband processor 1604. In one example, the baseband processor 1604 may be a component of the UE 350 and may include the memory 360 and/or at least one of the TX processor 368, the RX processor 356, and the controller/processor 359. In another example, the baseband processor 1604 may be a component of the base station and may include the memory 376 and/or at least one of the TX processor 316, the RX processor 370, and the controller/processor 375, or may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) or an entire base station and include the additional modules of the apparatus 1602.

The communication manager 1632 includes a reference signal process component 1640 that is configured to receive a configuration to measure a reference signal associated with UE positioning, e.g., as described in connection with 1502 of FIG. 15. The communication manager 1632 further includes a bandwidth division and offset process component 1642 that is configured to receive, from a transmitter, the reference signal via a plurality of sub-bandwidths, each of the plurality of sub-bandwidths being associated with a comb offset, e.g., as described in connection with 1504 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband processor 1604, includes means for receiving a configuration to measure a reference signal associated with UE positioning (e.g., the reference signal process component 1640 and/or the reception component 1630). The apparatus 1602 includes means for receiving, from a transmitter, the reference signal via a plurality of sub-bandwidths, each of the plurality of sub-bandwidths being associated with a comb offset (e.g., the bandwidth division and offset process component 1642 and/or the reception component 1630).

In one configuration, the reference signal may be a DL PRS or an UL SRS.

In another configuration, the comb offset for each of the plurality of sub-bandwidths may be different.

In another configuration, the plurality of sub-bandwidths may be received within a same time period.

In another configuration, each of the plurality of sub-bandwidths may be received at a different time period based on a frequency hopping pattern. In such a configuration, the apparatus 1602 includes means for receiving, from a network entity, a configuration for the frequency hopping pattern and the comb offset for each of the plurality of sub-bandwidths. In such a configuration, the network entity may include at least one of a location server, an LMF, or a base station. In such a configuration, the frequency hopping pattern may be based on at least one of time or frequency. In such a configuration, the frequency hopping pattern may be selected from a set of predefined frequency hopping patterns.

In another configuration, at least some of the plurality of sub-bandwidths may be received at different time periods.

In another configuration, the receiver may be a base station and the transmitter may be a UE. Alternatively, the receiver may be a UE and the transmitter may be a base station.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means. Alternatively, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including a memory; at least one transceiver; and at least one processor communicatively connected to the memory and the at least one transceiver, the at least one processor configured to: divide a reference signal associated with UE positioning into a plurality of sub-bandwidths, each of the plurality of sub-bandwidths being associated with a comb offset; and transmit, to a receiver, the reference signal via the plurality of sub-bandwidths.

Aspect 2 is the apparatus of aspect 1, where the reference signal is a DL PRS or an UL SRS.

Aspect 3 is the apparatus of any of aspects 1 and 2, where the comb offset for each of the plurality of sub-bandwidths is different.

Aspect 4 is the apparatus of any of aspects 1 to 3, where the plurality of sub-bandwidths is transmitted within a same time period.

Aspect 5 is the apparatus of any of aspects 1 to 4, where each of the plurality of sub-bandwidths is transmitted at a different time period based on a frequency hopping pattern.

Aspect 6 is the apparatus of any of aspects 1 to 5, where the at least one processor is further configured to: receive, from a network entity, a configuration for the frequency hopping pattern and the comb offset for each of the plurality of sub-bandwidths.

Aspect 7 is the apparatus of any of aspects 1 to 6, where the network entity includes at least one of a location server, an LMF, or a base station.

Aspect 8 is the apparatus of any of aspects 1 to 7, where the frequency hopping pattern is based on at least one of time or frequency.

Aspect 9 is the apparatus of any of aspects 1 to 8, where the frequency hopping pattern is selected from a set of predefined frequency hopping patterns.

Aspect 10 is the apparatus of any of aspects 1 to 9, where at least some of the plurality of sub-bandwidths are transmitted at different time periods.

Aspect 11 is the apparatus of any of aspects 1 to 10, where the transmitter is a base station and the receiver is a UE.

Aspect 12 is the apparatus of any of aspects 1 to 11, where the transmitter is a UE and the receiver is a base station.

Aspect 13 is a method of wireless communication for implementing any of aspects 1 to 12.

Aspect 14 is an apparatus for wireless communication including means for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication including a memory; at least one transceiver; and at least one processor communicatively connected to the memory and the at least one transceiver, the at least one processor configured to: receive a configuration to measure a reference signal associated with UE positioning; and receive, from a transmitter, the reference signal via a plurality of sub-bandwidths, each of the plurality of sub-bandwidths being associated with a comb offset.

Aspect 17 is the apparatus of aspect 16, where the reference signal is a DL PRS or an UL SRS.

Aspect 18 is the apparatus of any of aspects 16 and 17, where the comb offset for each of the plurality of sub-bandwidths is different.

Aspect 19 is the apparatus of any of aspects 16 to 18, where the plurality of sub-bandwidths is received within a same time period.

Aspect 20 is the apparatus of any of aspects 16 to 19, where each of the plurality of sub-bandwidths is received at a different time period based on a frequency hopping pattern.

Aspect 21 is the apparatus of any of aspects 16 to 20, where the at least one processor is further configured to: receive, from a network entity, an indication of the frequency hopping pattern and the comb offset for each of the plurality of sub-bandwidths.

Aspect 22 is the apparatus of any of aspects 16 to 21, where the network entity includes at least one of a location server, an LMF, or a base station.

Aspect 23 is the apparatus of any of aspects 16 to 22, where the frequency hopping pattern is based on at least one of time or frequency.

Aspect 24 is the apparatus of any of aspects 16 to 23, where the frequency hopping pattern is based on a set of predefined frequency hopping patterns.

Aspect 25 is the apparatus of any of aspects 16 to 24, where at least some of the plurality of sub-bandwidths are received at different time periods.

Aspect 26 is the apparatus of any of aspects 16 to 25, where the transmitter is a base station and the receiver is a UE.

Aspect 27 is the apparatus of any of aspects 16 to 26, where the transmitter is a UE and the receiver is a base station.

Aspect 28 is a method of wireless communication for implementing any of aspects 16 to 27.

Aspect 29 is an apparatus for wireless communication including means for implementing any of aspects 16 to 27.

Aspect 30 is a computer-readable medium storing computer executable code, where the code when executed by a processor causes the processor to implement any of aspects 16 to 27.

What is claimed is:

1. An apparatus for wireless communication, comprising:
   a memory;
   at least one transceiver; and
   at least one processor communicatively connected to the memory and the at least one transceiver, the at least one processor configured to:
   receive, from a network entity, a configuration for a frequency hopping pattern and a respective comb offset for each of a plurality of sub-bandwidths;
   divide a reference signal associated with user equipment (UE) positioning into the plurality of sub-bandwidths based on the configuration, each of the plurality of sub-bandwidths being associated with the respective comb offset; and
   transmit the reference signal via the plurality of sub-bandwidths, wherein each of the plurality of sub-bandwidths is transmitted at a different time period based on the frequency hopping pattern.

2. The apparatus of claim 1, wherein the reference signal is a downlink (DL) positioning reference signal (PRS) or an uplink (UL) sounding reference signal (SRS).

3. The apparatus of claim 1, where the respective comb offset for each of the plurality of sub-bandwidths is different.

4. The apparatus of claim 1, wherein the network entity includes at least one of a location server, a location management function (LMF), or a base station.

5. The apparatus of claim 1, wherein the frequency hopping pattern is based on at least one of time or frequency.

6. The apparatus of claim 1, wherein the frequency hopping pattern is selected from a set of predefined frequency hopping patterns.

7. The apparatus of claim 1, wherein to transmit the reference signal, the at least one processor is configured to transmit, to a UE, the reference signal.

8. The apparatus of claim 1, wherein to transmit the reference signal, the at least one processor is configured to transmit, to a base station, the reference signal.

9. A method of wireless communication, comprising:
   receiving, from a network entity, a configuration for a frequency hopping pattern and a respective comb offset for each of a plurality of sub-bandwidths;
   dividing a reference signal associated with user equipment (UE) positioning into the plurality of sub-bandwidths based on the configuration, each of the plurality of sub-bandwidths being associated with the respective comb offset; and
   transmitting the reference signal via the plurality of sub-bandwidths, wherein each of the plurality of sub-bandwidths is transmitted at a different time period based on the frequency hopping pattern.

10. The method of claim 9, where the respective comb offset for each of the plurality of sub-bandwidths is different.

11. An apparatus for wireless communication at a receiver, comprising:
    a memory;
    at least one transceiver; and
    at least one processor communicatively connected to the memory and the at least one transceiver, the at least one processor configured to:

receive, from a network entity, an indication of a frequency hopping pattern and a respective comb offset for each of a plurality of sub-bandwidths;

receive a configuration to measure a reference signal associated with user equipment (UE) positioning; and receive the reference signal via the plurality of sub-bandwidths, each of the plurality of sub-bandwidths being associated with the respective comb offset, wherein each of the plurality of sub-bandwidths is received at a different time period based on the frequency hopping pattern.

12. The apparatus of claim 11, wherein the reference signal is a downlink (DL) positioning reference signal (PRS) or an uplink (UL) sounding reference signal (SRS).

13. The apparatus of claim 11, where the respective comb offset for each of the plurality of sub-bandwidths is different.

14. The apparatus of claim 11, wherein the network entity includes at least one of a location server, a location management function (LMF), or a base station.

15. The apparatus of claim 11, wherein the frequency hopping pattern is based on at least one of time or frequency.

16. The apparatus of claim 11, wherein the frequency hopping pattern is based on a set of predefined frequency hopping patterns.

17. The apparatus of claim 11, wherein to receive the reference signal, the at least one processor is configured to receive, from a base station, the reference signal.

18. The apparatus of claim 11, wherein to receive the reference signal, the at least one processor is configured to receive, from a UE, the reference signal.

19. A method of wireless communication, comprising:

receiving, from a network entity, an indication of a frequency hopping pattern and a respective comb offset for each of a plurality of sub-bandwidths;

receiving a configuration to measure a reference signal associated with user equipment (UE) positioning; and receiving the reference signal via the plurality of sub-bandwidths, each of the plurality of sub-bandwidths being associated with the respective comb offset, wherein each of the plurality of sub-bandwidths is received at a different time period based on the frequency hopping pattern.

20. The method of claim 19, where the respective comb offset for each of the plurality of sub-bandwidths is different.

* * * * *